(12) United States Patent
Turchetta

(10) Patent No.: US 7,043,905 B2
(45) Date of Patent: *May 16, 2006

(54) GAS ENERGY CONVERSION APPARATUS AND METHOD

(76) Inventor: John M. Turchetta, 76 Sundale Rd., Cranston, RI (US) 02921

(*) Notice: Subject to any disclaimer, the term of this patent is extended or adjusted under 35 U.S.C. 154(b) by 0 days.

This patent is subject to a terminal disclaimer.

(21) Appl. No.: 11/137,266

(22) Filed: May 25, 2005

(65) Prior Publication Data

US 2005/0217259 A1    Oct. 6, 2005

Related U.S. Application Data

(63) Continuation of application No. 10/475,509, filed as application No. PCT/US02/12595 on Apr. 23, 2001, now Pat. No. 6,907,727.

(60) Provisional application No. 60/285,663, filed on Apr. 23, 2001.

(51) Int. Cl.
*F01B 25/00* (2006.01)
*F06D 31/02* (2006.01)

(52) U.S. Cl. ................ 60/409; 415/117; 415/144

(58) Field of Classification Search .......... 6/396, 6/409, 468; 415/17, 144, 145, 147, 199.5, 415/202

See application file for complete search history.

(56) References Cited

U.S. PATENT DOCUMENTS

| | | |
|---|---|---|
| 3,525,218 A | 8/1970 | Buss |
| 3,808,794 A | 5/1974 | Wood |
| 3,978,657 A | 9/1976 | Fulton et al. |
| 4,162,614 A | 7/1979 | Holleyman |
| 4,193,259 A | 3/1980 | Muenger et al. |
| 4,202,168 A | 5/1980 | Acheson et al. |
| 4,321,790 A | 3/1982 | Vadas et al. |
| 4,392,063 A | 7/1983 | Lindquist |
| 4,507,918 A | 4/1985 | Holleyman |
| 4,555,637 A | 11/1985 | Irvine |
| 4,707,978 A | 11/1987 | Cascajosa |
| 4,740,711 A | 4/1988 | Sato et al. |
| 4,809,510 A | 3/1989 | Gaspard et al. |
| 5,118,961 A | 6/1992 | Gamell |
| 5,606,858 A * | 3/1997 | Amir et al. ............ 60/648 |

* cited by examiner

*Primary Examiner*—Edward K. Look
*Assistant Examiner*—Igor Kershteyn
(74) *Attorney, Agent, or Firm*—Salter & Michaelson

(57) ABSTRACT

An apparatus having a pressure control system that balances the natural gas flow rate passing through a multi-stage, axial-flow, impulse turbogenerator to produce an electrical power output is provided. The pressure control system includes a primary bypass conduit circuit; pressure regulator valves; modulating valves; and flow sensors. The pressure control system is operatively connected to the multi-stage, axial-flow, impulse turbogenerator. The turbogenerator is operatively connected to both a microprocessor based governor control and a generator for producing electrical output and is preferably contained within a section of bypass conduit that is directly connected to an existing gas distribution pipeline. As the electrical load on the generator and downstream customer demand for gas fluctuate, the pressure control system can provide the proper amount of gas flow through the primary bypass and turbine that is required to produce a predetermined, steady state electrical output.

24 Claims, 21 Drawing Sheets

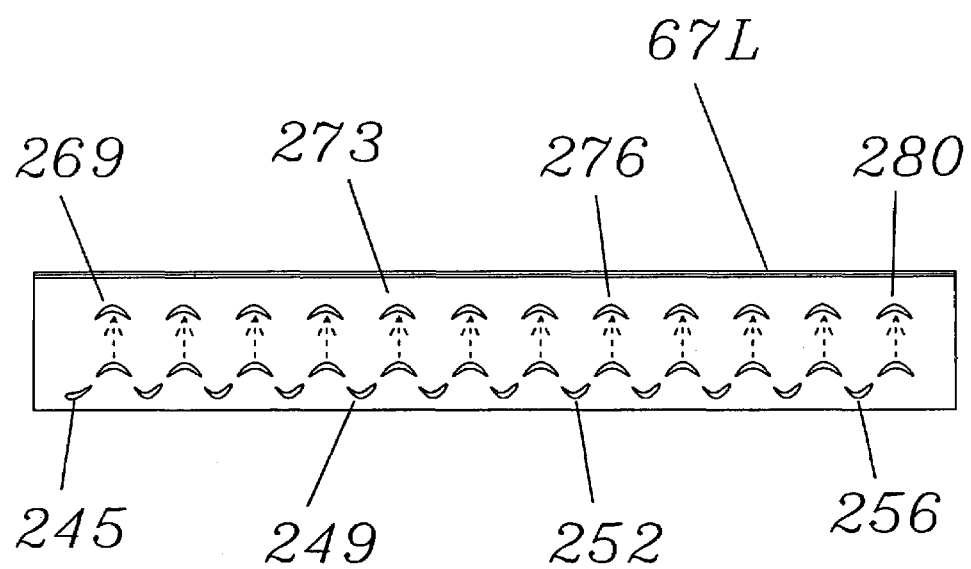
FIG. 5A(2)

GAS ENERGY CONVERSION APPARATUS AND METHOD

RELATED APPLICATIONS

This application claims priority to U.S. Ser. No. 10/475,509 filed on Oct. 22, 2003 now U.S. Pat. No. 6,907,727 which is a 371 of PCT/US02/12595 filed Apr. 23, 2001 which claims priority under 35 U.S.C. §120 to provisional Application Ser. No. 60/285,663 filed on Apr. 23, 2001, whose contents are hereby incorporated by reference.

TECHNICAL FIELD

The invention relates generally to a gas energy conversion system for generating electrical energy and, more particularly, to a gas energy conversion system including a multi-stage, axial flow, impulse turbogenerator which can be incorporated into existing natural gas transmission and/or distribution piping networks for generating electrical energy.

BACKGROUND OF RELATED ART

Transportation of natural gas from points of production to points of distribution takes place over great distances along natural gas transmission pipelines. These transportation pipelines are owned and operated by natural gas transmission companies. The natural gas within these transmission pipelines must possess very high-pressure energy (in excess of 1000 psi) to allow large quantities of gas to flow over these great distances. This pressure energy is supplied to the transmission pipelines by compressor stations that are strategically placed at numerous locations along the transmission pipelines.

Branching off the main transmission pipelines at numerous locations are distribution pipeline networks that distribute the natural gas to end-use consumers. These branch pipeline networks for gas distribution to consumers are typically owned and operated by local gas distribution companies. To make the natural gas safe for their customers for consumption, these local distribution companies must significantly reduce the high gas operating pressures supplied to their distribution piping networks from the main transmission pipelines. These points of gas pressure reduction for distribution take place along the distribution-piping network at pressure regulator stations called "city gate stations" and "district stations". The city gate station is usually the point where the local distribution company takes control of the natural gas. Each city gate and district station regulates the gas pressure in their distribution piping systems to satisfy fluctuating customer demand requirements. As customer demand for gas increases, the regulator station must increase system gas pressure and volumetric flow rate. As customer demand for gas decreases, the regulator station must respond by decreasing system gas pressure and volumetric flow rate. Thus, the control of gas pressure and volume flow rate is an important component when transporting natural gas.

Our society relies heavily on fossil fuels and nuclear energy for the production of electricity. However, the use of fossil fuels and nuclear energy is not without cost, both economically and environmentally. It is well known that the production of electrical power by conventional methods emits pollutants. In addition, safety factors are a concern in both areas, adding to the cost. Thus, there is a need for a system which can produce energy safely, and in an economically and environmentally efficient manner.

SUMMARY

One object of the present invention is to provide a method and apparatus which can be integrated into existing natural gas pipelines to regulate downstream gas distribution pipeline system flow rates and pressures. Another object is to produce electrical power output by harnessing the pressure energy available within the existing natural gas pipeline infrastructure.

In accordance with one aspect, there is provided an apparatus having a balancing pressure control system that balances the natural gas flow rate passing through a multi-stage-axial-flow-impulse-turbine (or prime mover). The pressure control system includes a primary bypass conduit circuit; pressure regulator valves; modulating valves; and flow sensors. The pressure control system is operatively connected to a multi-stage, axial-flow, impulse turbogenerator. The prime mover is operatively connected to both a microprocessor based governor control and a generator for producing electrical output. The prime mover is preferably contained within a section of bypass conduit that is directly connected to an existing gas transmission or distribution pipeline. As the electrical load on the generator and downstream customer demand for gas fluctuate, the pressure control system can provide the proper amount of gas flow through the primary bypass and turbine that is required to produce steady state electrical output. The prime mover is designed for direct installation into the primary bypass conduit. It is also preferably designed to be lightweight for fast response to transient conditions and possess the structural strength to resist high gas pressures.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which:

FIG. 5A(2) is an enlarged detailed section view of the nozzle and turbine rotor blade elements of FIG. 5;

DETAILED DESCRIPTION OF THE ILLUSTRATIVE EMBODIMENT

Figure 1:
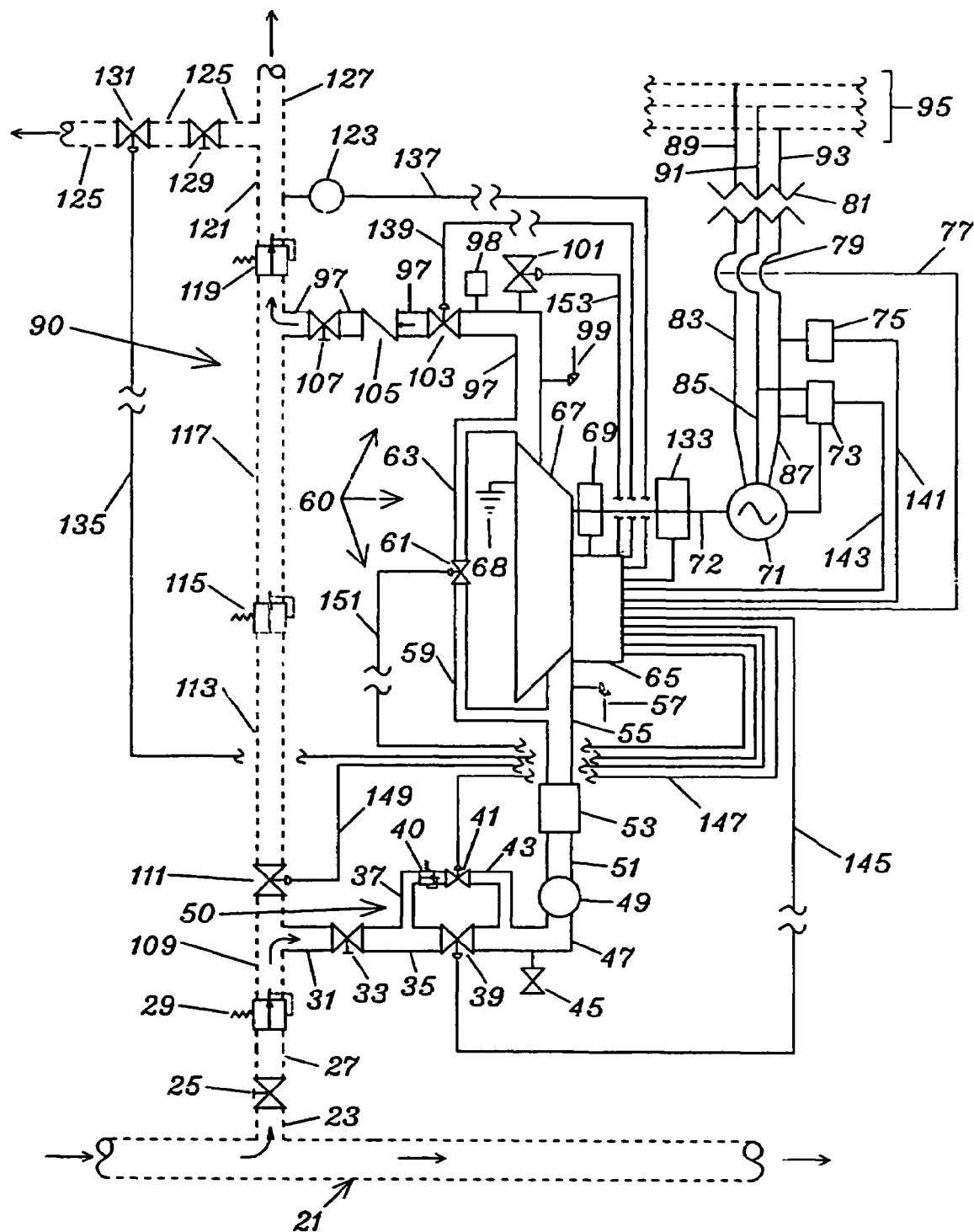
FIG. 1 is a diagrammatic layout illustrating the existing gas pipeline infrastructure with the present invention installed.

Referring initially to the FIG. 1, an existing, conventional high-pressure natural gas transmission pipeline 21 is illustrated. The pipeline is designed to deliver natural gas to independent local distribution companies, as is known in the art. Segments 23, 27, 109, 113, 117, 121, and 127 are part of a conventional single, natural gas distribution pipeline main 90 that branches off the high pressure transmission pipeline 21, as is conventional. The distribution pipeline main 90 connects the high-pressure transmission pipeline 21 with the downstream end use consumers. Conduit 125 is an existing branch distribution pipeline conduit for supplying gas to a distribution network that branches off the distribution pipeline main 90. Conventional manual shutoff valves 25 and 129 are also provided, and may be utilized for emergency shutdown of the pipeline distribution main. Conventional pressure regulators 29, 115, and 119 are also provided within pipeline main 90. In the illustrative embodiment, pressure regulator 29 is utilized for reducing the high transmission pipeline gas pressure to a level that will not structurally damage the multi-stage-axial-flow-impulse-turbine housed within primary bypass conduit 67. In the present embodiment, pressure regulator 115 is utilized for reducing back pressure acting against the gas flow exiting the turbine unit from section 97 of the primary bypass conduit circuit, whereas pressure regulator 119 is utilized for regulating gas pressure downstream of the primary bypass conduit circuit for the end use consumers.

The primary bypass conduit circuit 60 includes primary bypass conduit 67, as well as conduit segments 31, 35, 47, 51, 55, and 97. The primary bypass circuit receives gas flow that is diverted from the distribution pipeline main 90. The diverted gas flow traveling through the primary bypass conduit circuit 60 is utilized for driving a turbine housed within conduit 67. Valves 33 and 107 are preferably conventional manually operated valves that are provided within circuit 60 to isolate the primary bypass circuit from the distribution pipeline main for emergency/maintenance procedures. Valve 111 acts as a bypass valve to divert gas flow from distribution pipeline main segment 109 into segment 31 of the primary bypass conduit circuit. For example, if the turbine is in need of maintenance, the valves 33 and 107 will be closed such that the gas flow will not be diverted to the bypass conduit circuit 60. Valves 39 and 103 are also preferably conventional electrohydraulic modulating valves which control the gas flow to the turbine. In the present embodiment, valves 39 and 103 are controlled by a microprocessor based governor control system 65 which is operatively connected to the turbine. The governor control system 65 is of well known construction and can be used to control both modulating valves 39 and 103 via electric circuits 139 and 145. Modulating valve 111 is also preferably a conventional electrohydraulic modulating valve which can be actuated through electric circuit 149 by a microprocessor based governor control system 65.

Conduits 37 and 43 preferably form secondary modulating valve bypass conduit 50 around modulating valve 39. The function of this secondary modulating valve bypass conduit is to control the gas pressurization (i.e., loading) of the primary bypass conduit circuit 60 after the turbine has been installed within the conduit 67 and the primary bypass conduit circuit is initially charged with gas. The secondary modulating valve bypass conduit 50 helps prevent pressure shocking of the turbine unit that could result from a sudden in rush of high pressure gas into an empty primary bypass conduit circuit 60. A conventional electrohydraulic valve 41 is also provided, which acts as a loading valve for allowing gas to enter the primary bypass conduit circuit during initial charging. Valve 41 is actuated by the governor control system 65 through electric circuit 147 in the present embodiment. A conventional pressure regulator 40 may also be provided to reduce the higher upstream system pressure to the level required downstream in the primary bypass conduit circuit for safe pressure loading of the turbine unit. Conventional pressure relief valves 57 and 99 are provided to prevent overpressurization of the turbine. Overpressurization could result if pressure regulator 29 malfunctions and exposes the primary bypass conduit circuit and turbine to high transmission main pressure.

Conduits 59 and 63 form a secondary turbine bypass 70 around the turbine housed within conduit 67. Secondary bypass valve 61 is preferably incorporated within the secondary turbine unit bypass 70 and is also an electrohydraulic modulating valve of known construction. Valve 61 may also preferably be actuated by the governor control system 65 from electric circuit 151 in the present embodiment. The function of the secondary turbine bypass 70 is to control the ramp up speed of the turbine from an at rest position to its required rpm speed level for generating electrical power. This is accomplished by having valve 61 in the fully open position (or full bypass) at start initiation. As valve 61 is gradually closed the gas flow increases through conduit circuit 67 which increases the rpm speed of the turbine housed within it. Electrical grounding circuit 68 is provided within the secondary bypass 70 to eliminate dangerous static charge accumulation on the conduit walls and turbine components from frictional gas flow.

With continued reference to FIG. 1, another conventional electrohydraulic modulating valve 101 is provided to reduce (or unload) gas pressure from the primary bypass conduit circuit 60 prior to initiating startup of the turbine unit. This step is used to establish an optimum gas pressure differential between the distribution pipeline main 90 and the primary bypass conduit circuit 60 so that gas flow within the primary bypass can initiate when a turbine start signal is given by the governor control system 65. Valve 101 may preferably be actuated by governor control 65 through electric circuit 153. A second function of valve 101 is to purge the primary bypass conduit circuit of gas.

Purging of the primary bypass conduit circuit is preferably accomplished prior to removal of the turbine unit from the primary bypass conduit circuit for periodic maintenance and inspection activities. This gas purge sequence preferably consists of valve 101 being opened and the turbine being simultaneously spun by electrohydraulic starter 133. Starter 133 is of known construction, is connected to the generator drive shaft 72, and is equipped with an overrunning clutch mechanism, also of known construction. The starter operates to initiate rotation of the turbine unit whenever a start signal is received. The spinning turbine draws remaining gas residue within the primary bypass conduit circuit and pushes it through open valve 101 to atmosphere or for utilization as supply gas to gate station boilers (not shown). A conventional combustible gas detector 98 is preferably incorporated in a feedback control system with the governor control system 65. When detector 98 no longer detects the presence of combustible gas in the primary bypass conduit circuit, a feedback signal is sent to the governor control system 65. The governor control system 65 then sends a signal to close valve 101 and terminate the spin cycle of the turbine. The turbine may then be removed for maintenance and the like.

The combustible gas detector 98 may also be continuously utilized as a safety control device during turbine pre-startup and run mode conditions, as desired. If a combustible gas mixture is detected during pre-startup initiation mode, a feedback signal can be sent to governor control system 65 and the pre-startup initiation will be halted. Similarly, if a combustible gas mixture is detected by detector 98 while the turbine is in its running mode, a feedback control signal will be sent to governor control system 65 and a turbine shut-down sequence will be initiated by governor control system 65. The shut-down sequence may consist of the turbine being taken off-line (i.e., circuit breaker 79 opened), modulating valves 39 and 103 closing, bypass valve 111 opening, and magnetic brake 69 actuating. This shut-down sequence allows the turbine to be brought to a safe stop.

The gas flow rate in the distribution pipeline main 90 downstream of the primary bypass conduit 67 is preferably monitored by a conventional gas flow transmitter 123 which is preferably linked to the governor control system 65 by electric feedback circuit 137. The gas flow transmitter 123 also issues feedback signals to the governor control system 65. A conventional electrohydraulic modulating valve 131 which is linked to the governor control system 65 by electric circuit 135 is also preferably provided. Control sequences can be initiated by gas flow transmitter 123 according to the following operational situations:

1. The turbine is stopped (i.e., off-line);
   a. If flow is insufficient to run the turbine at full electrical load and valve 131 is open, the flow transmitter 123 sends a signal to the governor control system 65 to prevent startup of the turbine.
   b. If flow is insufficient to run the turbine at full electrical load and valve 131 is closed, the flow transmitter sends a signal to the governor 65 to open valve 131. This action will increase gas flow. If this increased gas flow rate is above the minimum required for operation of the turbine, a turbine start signal will be initiated by governor control 65. If the increased gas flow rate resulting from opening valve 131 is still insufficient for turbine operation, the governor 65 will not issue a turbine startup signal and startup of the turbine will be prevented.

To prevent unwanted gas backflow through the primary bypass conduit circuit, a conventional back flow check valve 105 is also preferably provided. Such back flow through the primary bypass conduit circuit may result from an abnormal downstream backload. A conventional magnetic brake 69 may also be provided to stop the rotation of both the generator drive shaft 72 and turbine and can be activated by the governor control system 65 which sends a stop signal to the brake when appropriate. A conventional circuit breaker 79 may be provided which can be opened/closed by electric circuit 77. In the present embodiment, circuit 77 receives its control signal from the governor control system 65 in response to feedback control signals received by governor control system 65 over electric circuit 141 from frequency transducer 75, which is of known construction. During a turbine start sequence, the frequency transducer 75 sends a signal to the governor control system 65 to close the circuit breaker 79 once the turbine reaches its optimal steady state rpm speed to produce approximately 60 hz electrical output. If, while the circuit breaker is closed the electrical output produced by the turbine deviates from the approximately 60 hz requirement (transient), the frequency transducer responds by sending a feedback signal to the governor control system 65. The governor control system 65 may then increase or decrease the turbine rpm speed by sending appropriate control signals to modulating valves 39, 103, and 111 which control the flow rate through the primary bypass circuit. If, within a specific time period, the transient condition is not eliminated and the approximately 60 hz steady state electrical output restored, the frequency transducer 75 can send a signal for the governor control system 65 to open circuit breaker 79 and begin a shut-down sequence for the turbine.

Generator 71 of known construction may preferably be directly coupled to the turbine unit housed within the primary bypass conduit 67 and is also connected (preferably directly) to the end of generator drive shaft 72. A conventional voltage regulator 73 may be provided to control the voltage output level of generator 71 and a conventional electric circuit 143 is provided to connect the governor control system 65 to the voltage regulator 73. Electrical output terminal lead wires 83, 85, and 87 preferably emerge from generator 71, as is known in the art. A conventional step-up transformer 81 for increasing the voltage output level from the generator 71 is also preferably provided. Transformer 81 exports its output power onto the existing electric utility grid system 95. Secondary lead wires 89, 91, and 93 connect the transformer 81 to the utility grid 95 in the present embodiment. A conventional gas filter, or separator 49 is preferably provided to filter out potentially harmful particles suspended in the gas before they reach the turbine. A conventional line heater 53 may also be provided and can be activated if the gas stream contains water vapor contents at levels great enough to produce hydrates resulting from gas expansion and temperature drop through the turbine power section. If such a condition exists, the line heater 53 can be utilized to preheat the gas to a sufficient temperature before entering the turbine so as to prevent hydrates from forming.

Valve 45, also of known construction, is utilized to admit nitrogen into the section of the primary bypass conduit circuit located between modulating valves 39 and 103. Nitrogen is admitted upon re-installation of the turbine unit into the primary bypass conduit circuit, for example after inspection/maintenance has been performed. This is done to eliminate a possibly hazardous condition which may exits upon re-installation. After removal and re-installation, the primary bypass conduit is air-bound which could create a hazardous condition of modulating valves 39, 41, or 103 are open thereby allowing natural gas to enter and mix with the air. Using pressurized nitrogen to remove the air from the primary bypass conduit helps to eliminate this potentially hazardous condition. The pressurized nitrogen would enter the air bound volume through open valve 45, and push the air through open valve 101 to atmosphere. When all of the air has been purged from the volume, valves 45 and 101 may then be closed. The primary bypass would then be in a safe condition for the modulating valves to open and introduce natural gas into the conduit volume.

Typical basic operating sequences of the FIG. 1 balancing pressure control system are described as follows for A) turbine startup; B) turbine speed ramp-up; C) turbine run mode; and D) turbine shutdown modes, although other basic operating sequences may be utilized:

A.) TURBINE STARTUP SEQUENCE;
1. The gas flow transmitter 123 detects sufficient gas flow within the distribution pipeline main for turbine operation and sends a feedback control signal to governor control 65 for turbine startup to initiate.
2. Governor control 65 sends a control signal to actuate loading valve 41. Valve 41 opens and pressurizes the primary bypass conduit 67 housing the turbine. Upon completion of primary bypass loading, governor control 65 sends a control signal to close valve 41.
3. Governor control 65 actuates electrohydraulic starter 133 and spinning of the turbine begins.
4. Governor control 65 begins actuating modulating valves 39, 103, and 111 and gas flow into the primary bypass conduit begins.
5. Governor control 65 sends a control signal to the turbine secondary bypass modulating valve 61 to begin closing. Gas flow through the turbine increases as valve 61 closes and turbine rpm speed begins to increase.

B) TURBINE SPEED RAMPUP TO OPERATING SPEED:
1. After governor control 65 has fully closed valve 61 the final turbine speed rampup begins. The electrohydraulic starter 133 disengages from the turbine through its overrunning clutch.
2. Governor control 65 continues to modulate (open) valves 39 and 103, and close valve 111 to increase gas flow into the primary bypass conduit. The frequency transducer 75 continuously sends feedback signals to governor control 65. The governor control 65 continues to adjust valves 39, 103, and 111 until the generator 71 electrical frequency output feedback signal received from frequency transducer 75 is about 60 Hz, for the present embodiment. If this frequency feedback signal is below about 60 Hz, the governor control 65 adjusts valves 39, 103, and 111 to increase the flow rate into the primary bypass and increase turbine rpm speed. If the feedback signal is above about 60 Hz, the governor control 65 responds by adjusting valves 39, 103, and 111 to decrease the flow rate into the primary bypass conduit and decrease the turbine rpm speed.
3. When the governor control 65 receives a steady state frequency output of about 60 Hz from frequency transducer 75, the turbine has reached operating speed and a signal to close circuit breaker 79 is issued by the governor control 65.

C) TURBINE RUN MODE:
1. When circuit breaker 79 is closed, the generator is loaded and the turbine speed is decreased. This speed decrease will also decrease the generator 71 frequency output below the about 60 Hz level. Frequency transducer 75 detects and sends this lower frequency output signal to governor control 65.
2. Governor control 65 responds to the lower frequency output signal and increases the gas flow rate through the primary bypass circuit housing the turbine. Adjustment of modulating valves 39, 103, and 111 accomplish this.
3. Adjustment of the gas flow rate through the primary bypass conduit by governor control 65 is completed when the frequency output detected by frequency transducer 75 reaches about a 60 Hz steady state operating level.

D) TURBINE SHUTDOWN MODE:
1. Downstream consumer demand for gas will drop below the minimum required level to operate the turbine when the primary bypass valve 111 is fully closed, valves 39, 103 and 131 are fully open, and the frequency output from generator 71 falls below the required 60 Hz output level.
2. When valves 39, 103, 111, and 131 are in the above configurations (full bypass mode) and generator frequency output is below about 60 Hz, governor control 65 issues commands to initiate turbine shutdown. These commands may preferably be as follows:
   a) Circuit breaker 79 is opened and magnetic brake 69 is activated;
   b) Primary bypass valve 111 is opened;
   c) Modulating valve 39 is closed and secondary bypass valve 61 is opened;
   d) When the turbine comes to a stop, valve 103 is closed;
3. The system will remain on standby until downstream gas demand is restored to the minimum level required for turbine operation.

Referring now to FIGS. 2–5E, the multistage, axial flow, impulse turbine (i.e., prime mover) 200 is shown within conduit 67. The conduit 67 includes a first or left half 67L and a second, or right half 67R (which are preferably split vertically) with a portion of wall section of conduit circuit 67R being removed in FIG. 2 to show the turbine within the right half of the conduit. The conduit is preferably split to allow easy accessibility to the turbine for maintenance inspection and the like. Conduit section 55 is an upstream section and conduit section 97 is a downstream section of the primary bypass conduit 67. Sections 55 and 95 are secured, for example by bolting through flanges, to both the left and right sections 67L and 67R. Rear and front bearing housings 201 and 311 support turbine shaft 323. The turbine shaft 323 revolves around its longitudinal axis inside each bearing housing during operation of the turbine unit.

Figure 3:
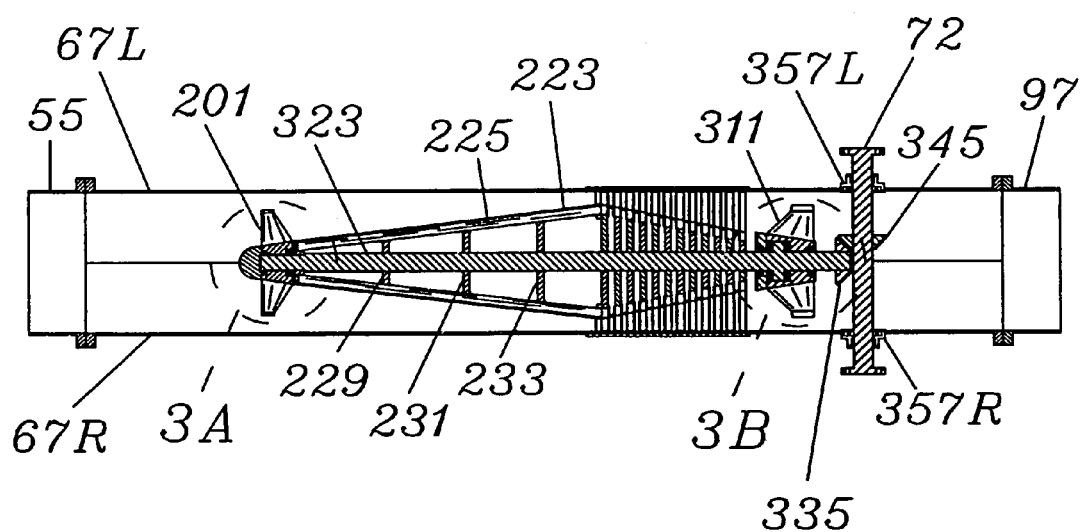
FIG. 3 is a plan view of the primary bypass conduit section that houses the turbine taken along line 3—3 of FIG. 2.
Figure 3A:
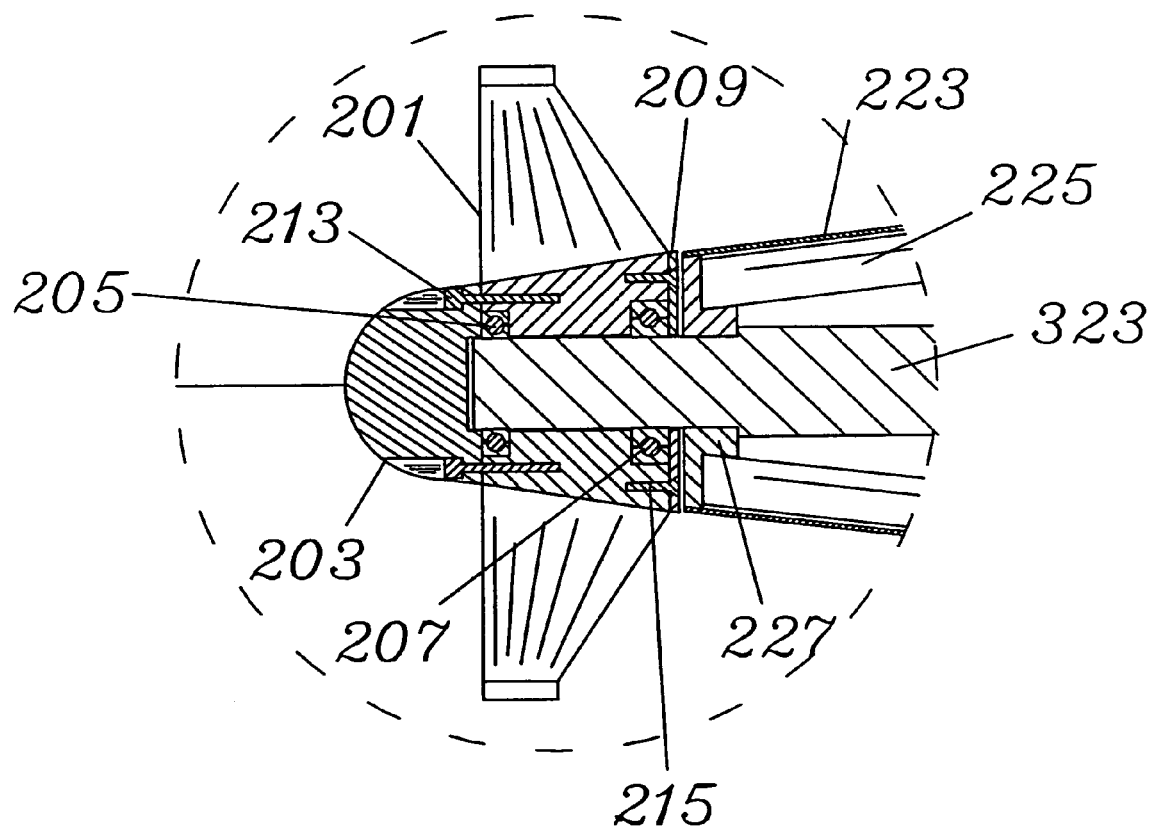
FIG. 3A is an enlarged section detail of the turbine rear bearing housing of FIG. 3.

Rear bearing housing 201 supports the upstream end of the turbine shaft 323 as shown in greater detail in FIG. 3A. The housing 201 preferably includes a center, circular hub and tapered salient struts which are attached to the conduit halves 67L, 67R. The hub preferably houses radial bearings 205 and 207 that support the upstream end of the turbine shaft 323. Retainer plate 209 for bearing 207 may be connected to the bearing housing 201, for example by fasteners such as screws 215. In the present embodiment, four strut members are provided, although the number can be varied as would be known of those to skill in the art. Two adjacent outboard strut ends may preferably be attached directly to the vertically split conduit half 67R. The strut members connect and restrain the bearing housing within the primary bypass conduit. End cap 203 is preferably spherically shaped, and is connected to the hub of rear bearing housing 201 by the fasteners 215. A clearance should exist between the upstream end of turbine shaft 323 and the end cap 203 in order to allow for unrestrained thermal elongation of the turbine shaft.

Figure 3B:
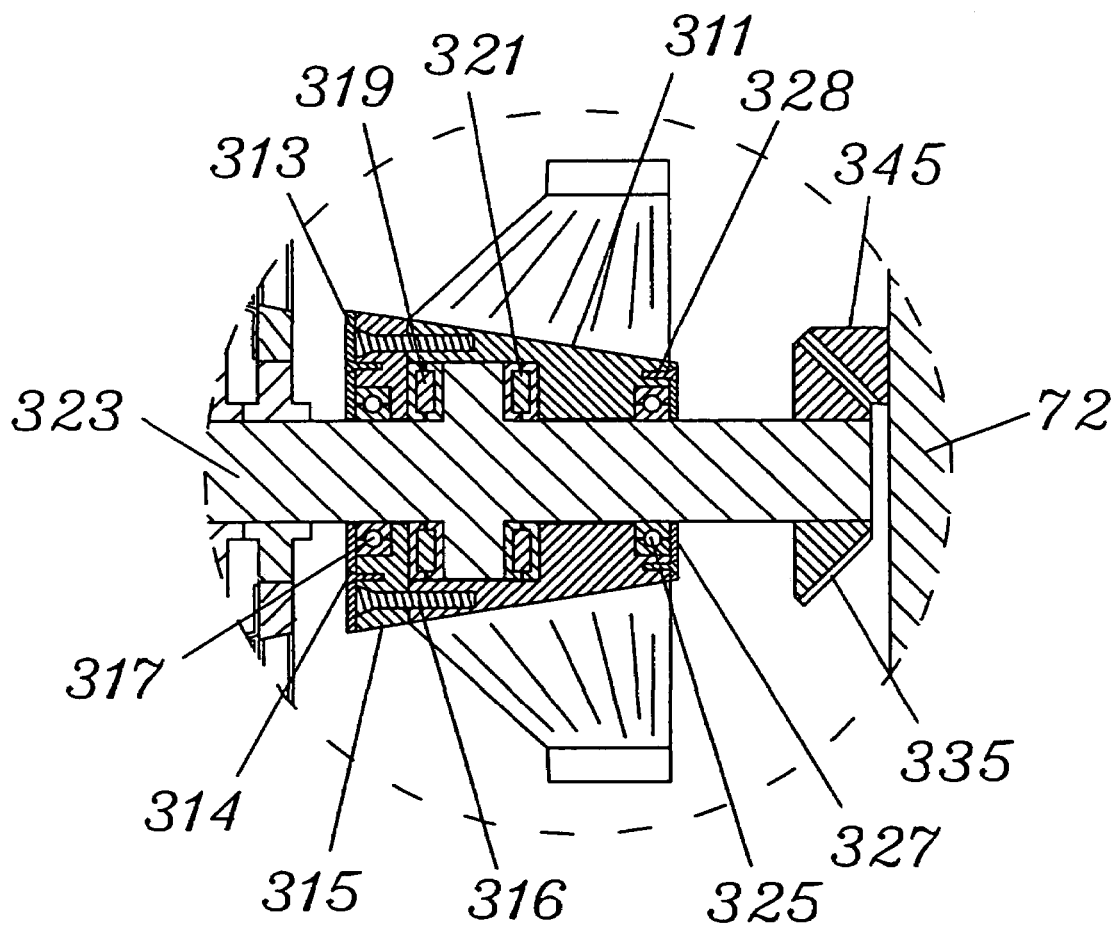
FIG. 3B is an enlarged section detail of the turbine front bearing housing of FIG. 3.

Front bearing housing 311 supports the downstream end of the turbine shaft 323 as shown in greater detail in FIG. 3B. The housing 311 preferably includes a center, circular hub and tapered salient strut members which are attached to the conduit halves 67L, 67R. In the present embodiment, four strut members are provided, although the number can be varied as would be known of those to skill in the art. The strut members connect and restrain the bearing housing within the primary bypass conduit. Within the center hub of the front bearing housing are disposed thrust bearings 319, 321 and radial bearings 317, 325. The thrust bearings transmit the downstream axial thrust force from turbine shaft 323 to housing 311 which is supported by and restrained by each conduit half. The radial bearings within housing 311 are for shaft 323 support in the radial directions. A retainer plate 313 is preferably provided for radial bearing 317, while retainer housing 315 is provided for thrust bearing 319. In the present embodiment, retainer plate 313 is connected to retainer housing 315 by fasteners 314. Retainer plate 327 is provided for radial bearing 325, and is connected to the central hub by fasteners 328. Bevel gear 335 is also provided which is connected to the downstream end of turbine shaft 323. In use, the first bevel gear 335 meshes with a second bevel gear 345 at approximately a right angle and transmits turbine shaft 323 rotational motion into bevel gear 345 rotational motion to produce rotation of the generator drive shaft 72. Bevel gear 345 is further connect to generator drive shaft 72.

Referring again to FIG. 3, discs 229, 231, 233, are disposed between the front and rear bearing housings 201, 311 and provide radial structural support for longitudinal rib elements 225. The discs are preferably circular, and the rib elements preferably include one or more continuous corrugated rib beam elements that form shell 223. Discs 229, 231, 233 may preferably include concentric center holes for the turbine shaft 323 to pass through, and are preferably approximately equally spaced from and connected to the turbine shaft 323.

Outer shell or shroud 223 forms the tapered body section of the turbine. The shell 223 preferably has a tapered construction to aid the turbine in withstanding the pressures traveling through the primary bypass conduit which can be about 1,000 psi in the present embodiment. Shell 223 preferably includes a relatively thin walled, tapered circular cone that is connected to and reinforced by rib elements 225. The rib elements 225 also aid in preventing the external gas pressure in the primary bypass conduit from crushing inward the shell 223 by reinforcing the shell. Disc 227 (FIG. 3A) provides radial support for the upstream end of rib beam elements 225. Disc 227 is preferably attached to both the turbine shaft 323 and rib beam elements 225. A clearance is necessary between disc 227 and bearing retainer plate 209 after thermal expansion of the turbine shaft and bearing housing hub has taken place.

Figure 2:
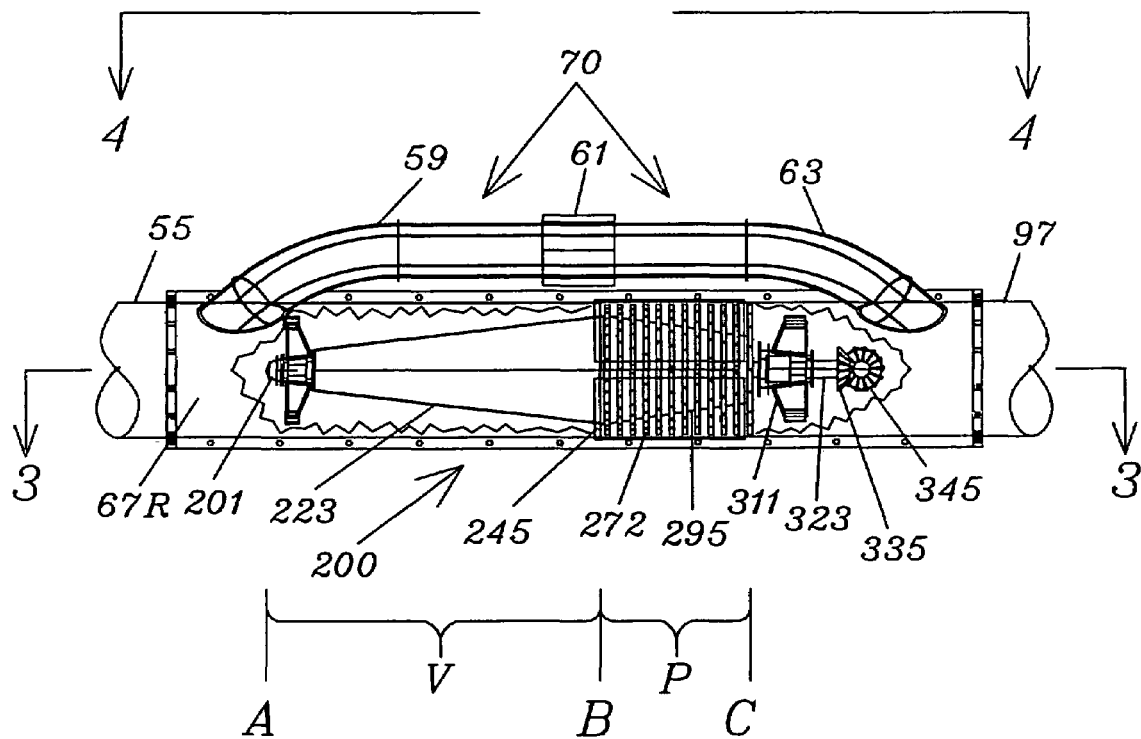
FIG. 2 is a side elevation view, partially broken away, of the section of primary bypass conduit that houses the multistage-axial-flow-impulse-turbine.
Figure 6:
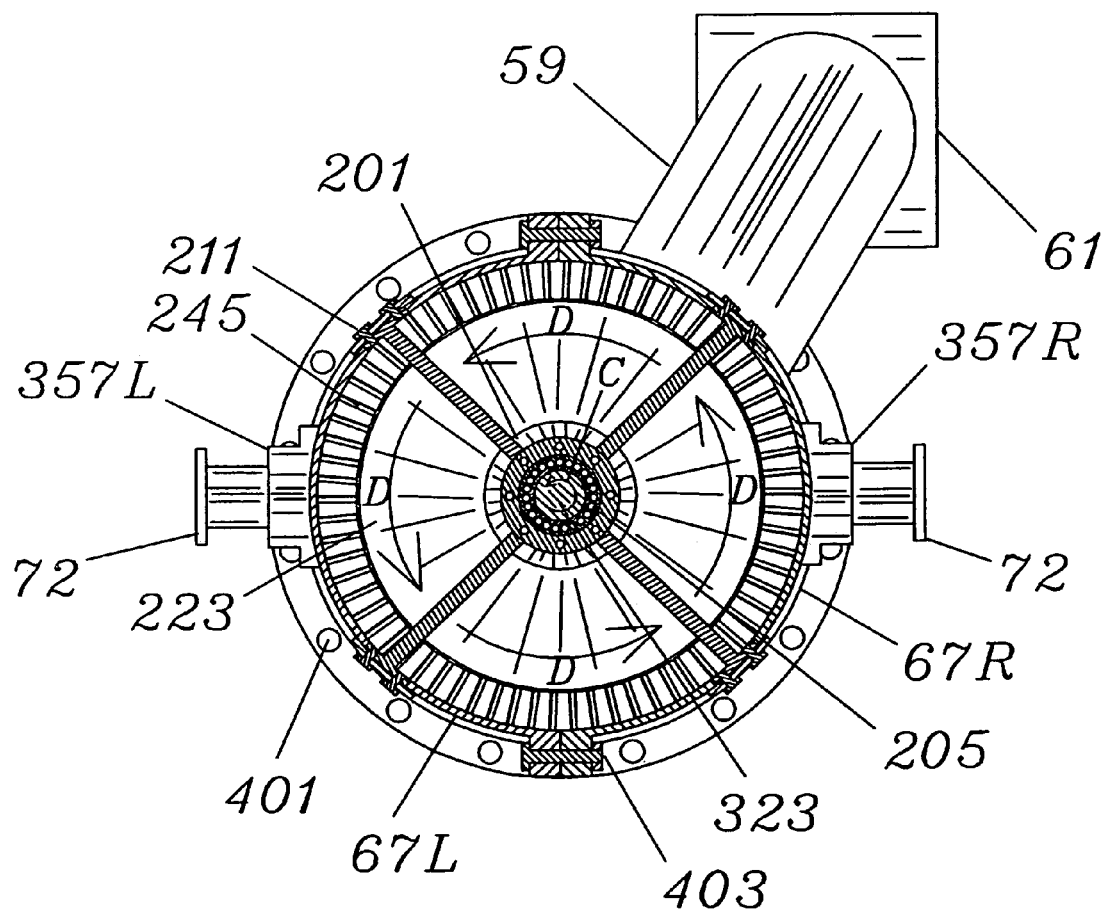
FIG. 6 is a cross-sectional view of the turbine taken through the rear bearing housing along lines 6—6 of FIG. 4.

As shown in FIG. 2, the tapered body section of the shell 223 between reference "A" and reference "B" is a venturi section, "v", of the turbine. The venturi section increases the gas velocity available for driving the turbine in the power section, "p", which is disposed between reference B and reference C. The turbine further includes a first stage nozzle section element 245 which preferably includes a circular ring flange having a series of approximately evenly spaced curved surfaces that are supported with the ring and project inward therefrom. The circular ring flange may be attached to each half 67L, 67R of the vertically split conduit so as to attach the nozzle section element 245 thereto. The nozzle section element 245 directs gas flow onto the rotor blades. First stage nozzle section element 245 of the turbine power section is also illustrated in FIG. 6. A clearance preferably exists between the inner tip edge of the nozzle element 245 and the exterior surface of the tapered outer shell 223. Turbine 200 further includes a fourth stage impulse rotor blade 272 which transmits rotational motion to turbine shaft 323. Shroud segment 295 is provided to create the inner flow surface boundary for gas flow in the power section of the turbine.

Identical left and right stuffing boxes 357L and 357R through which the generator drive shaft ends pass through are also preferably provided in the present embodiment as shown in FIG. 3. Each stuffing box preferably includes a circular housing which is secured (for example by welding) around the perimeter of a penetration hole in the conduit circuit 67L and 67R for generator drive shaft 72. The stuffing boxes are provided for dynamic sealing against gas leakage around the drive shaft 72, and also provide end support against radial and axial displacement of the drive shaft.

Figure 4:
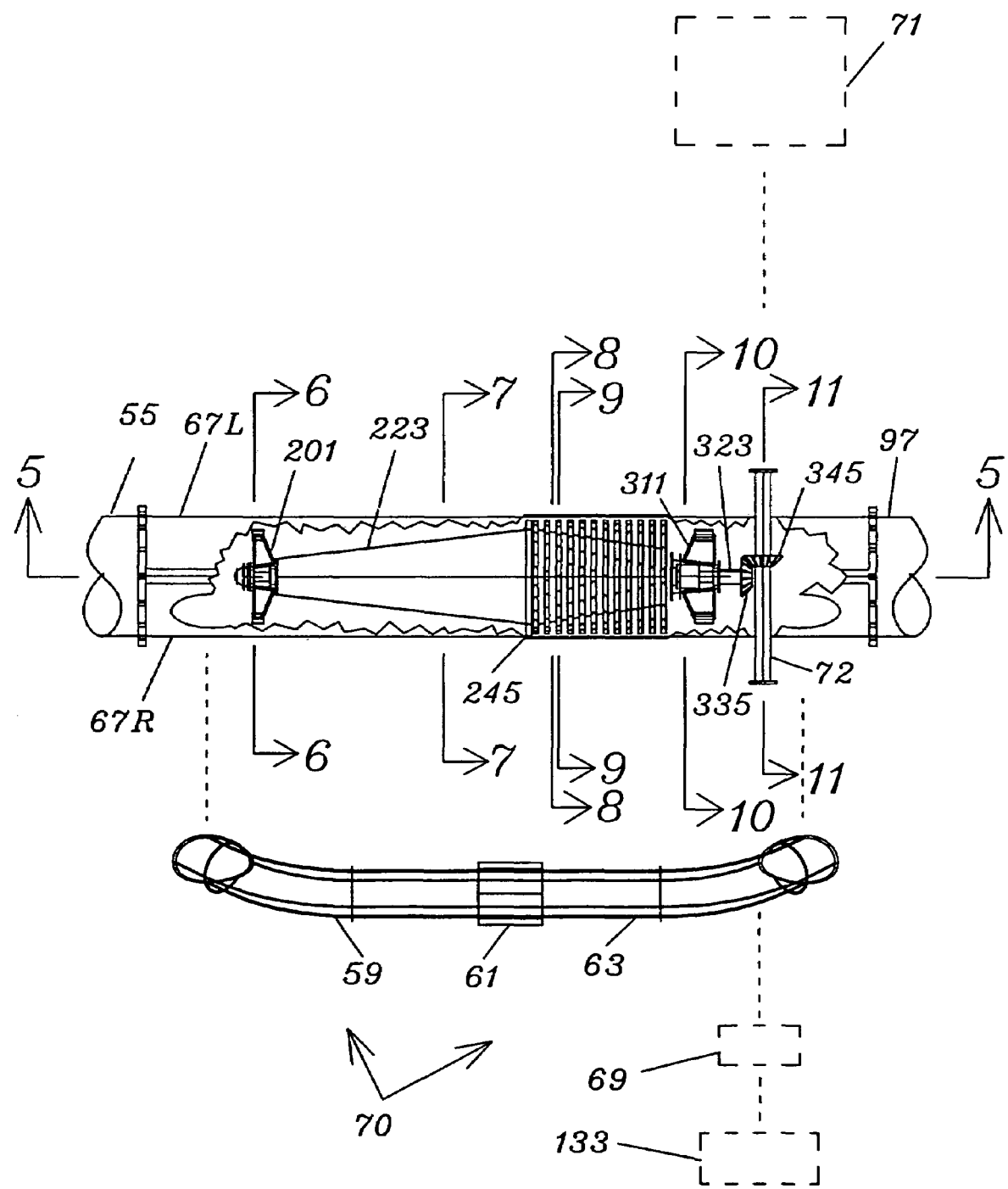
FIG. 4 is a partially exploded, plan view of the section of primary bypass conduit that houses the turbine, partially broken away.

Referring now to FIGS. 2 and 4, secondary turbine bypass 70 including bypass ducts 59, 63 and bypass duct bleed valve 61 operate to divert gas flow in the primary bypass conduit 67 around the turbine during initial startup operation of the turbine. This is accomplished when the valve 61 is in the open position. Valve 61 can modulate from the open to the closed position, which directs all of the primary bypass gas flow through the turbine. This provides a controlled ramp up of turbine rpm speed. The secondary bypass ducts 59 and 63 along with the generator 71, magnetic brake 69 and electrohydraulic starter 133 (described above) are shown in offset (or exploded) positions from the conduit sections 67L and 67R in FIG. 4.

Figure 5:
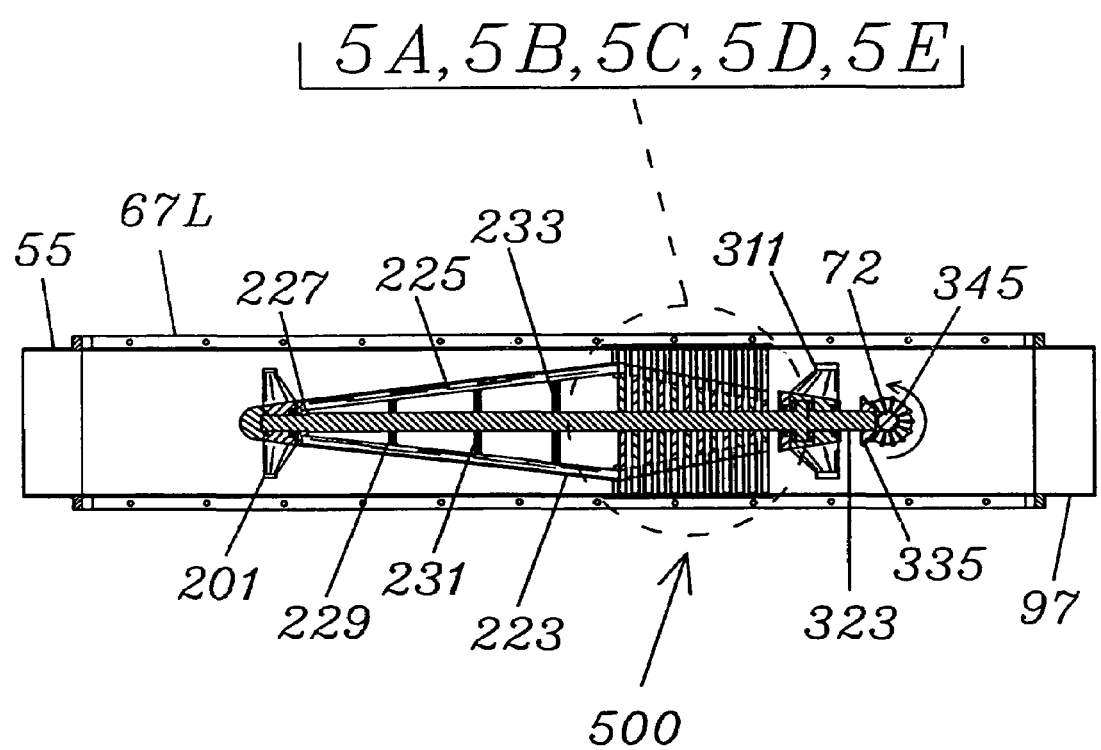
FIG. 5 is a section view of the turbine taken along line 5—5 of FIG. 4.
Figure 5A:
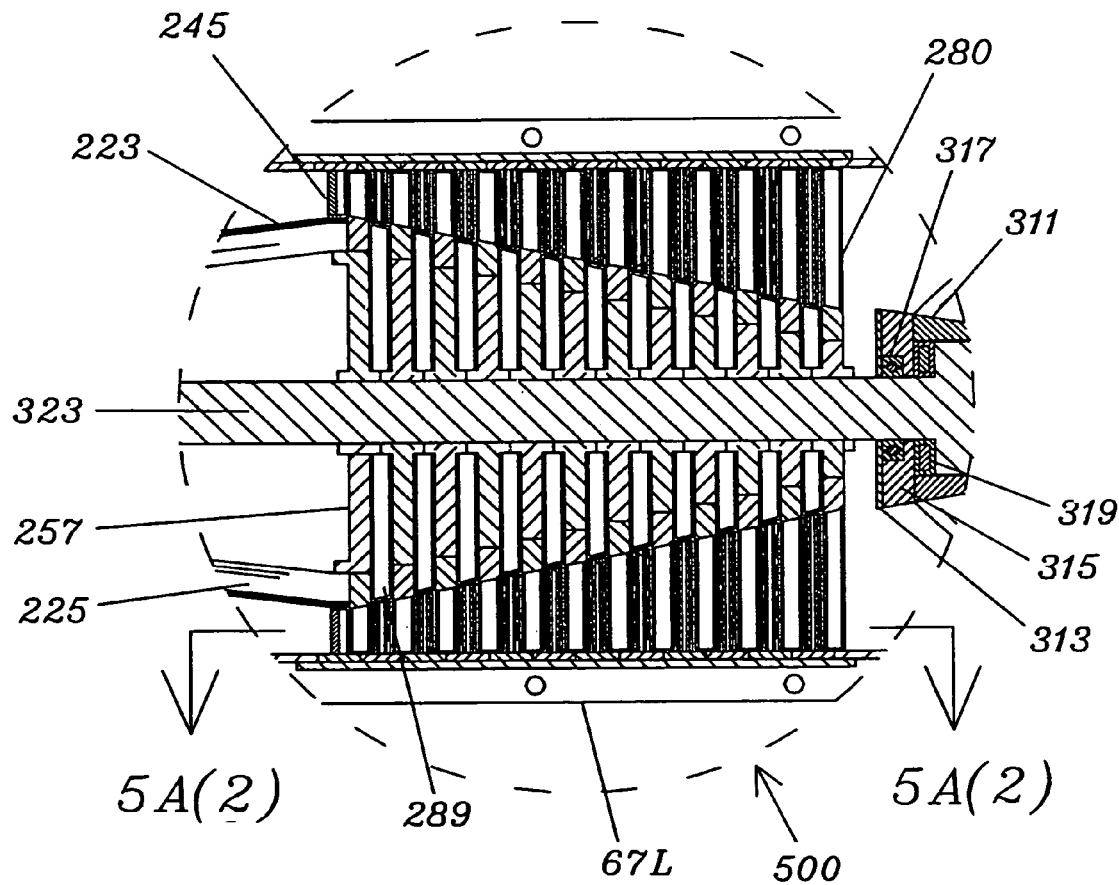
FIG. 5A is an enlarged detailed section view of the power section of the turbine of FIG. 5.

As shown most clearly in FIG. 5A, an enlarged sectional view of the turbine power section 500 that produces rotation of turbine shaft 323 from the flow of gas through the primary bypass conduit is illustrated. Rotor disc 257 is connected to the turbine shaft 323, and shroud 289 is connected to adjoining disc elements. Both the disc 257 and the shroud 289 are preferably circular in the present embodiment. The shroud 289 functions to provide an inner surface boundary for gas flow through the power section 500, and to attach adjacent rotor discs. The downstream end of rib beam elements 225 are also preferably connected to the rotor disc element 257. Turbine rotor blade 280 is likewise connected to its mating, circular rotor disc, as shown.

Figure 5B:
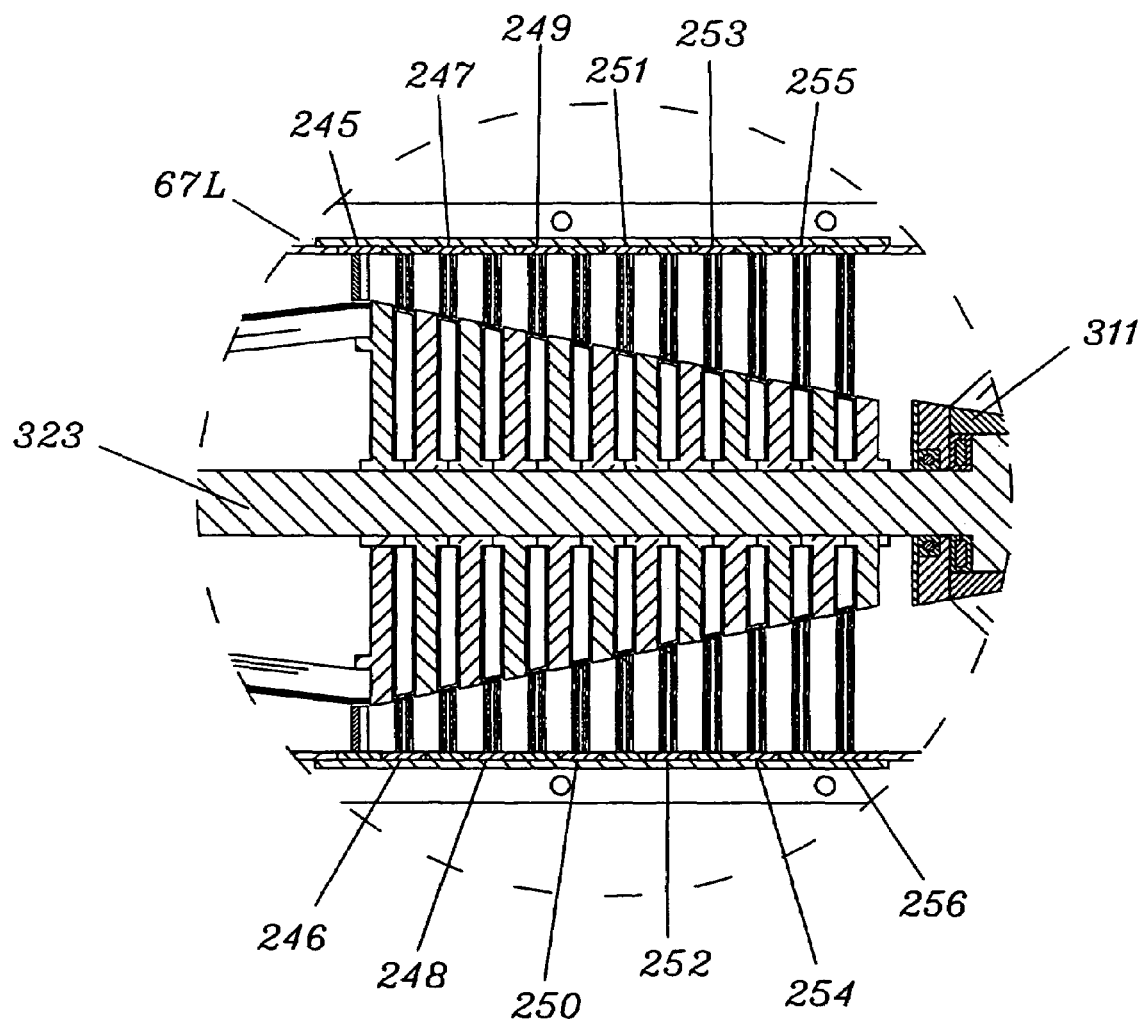
FIG. 5B is an enlarged detailed section view of the nozzle of FIG. 5, with the turbine rotor blade elements hidden from view.
Figure 5C:
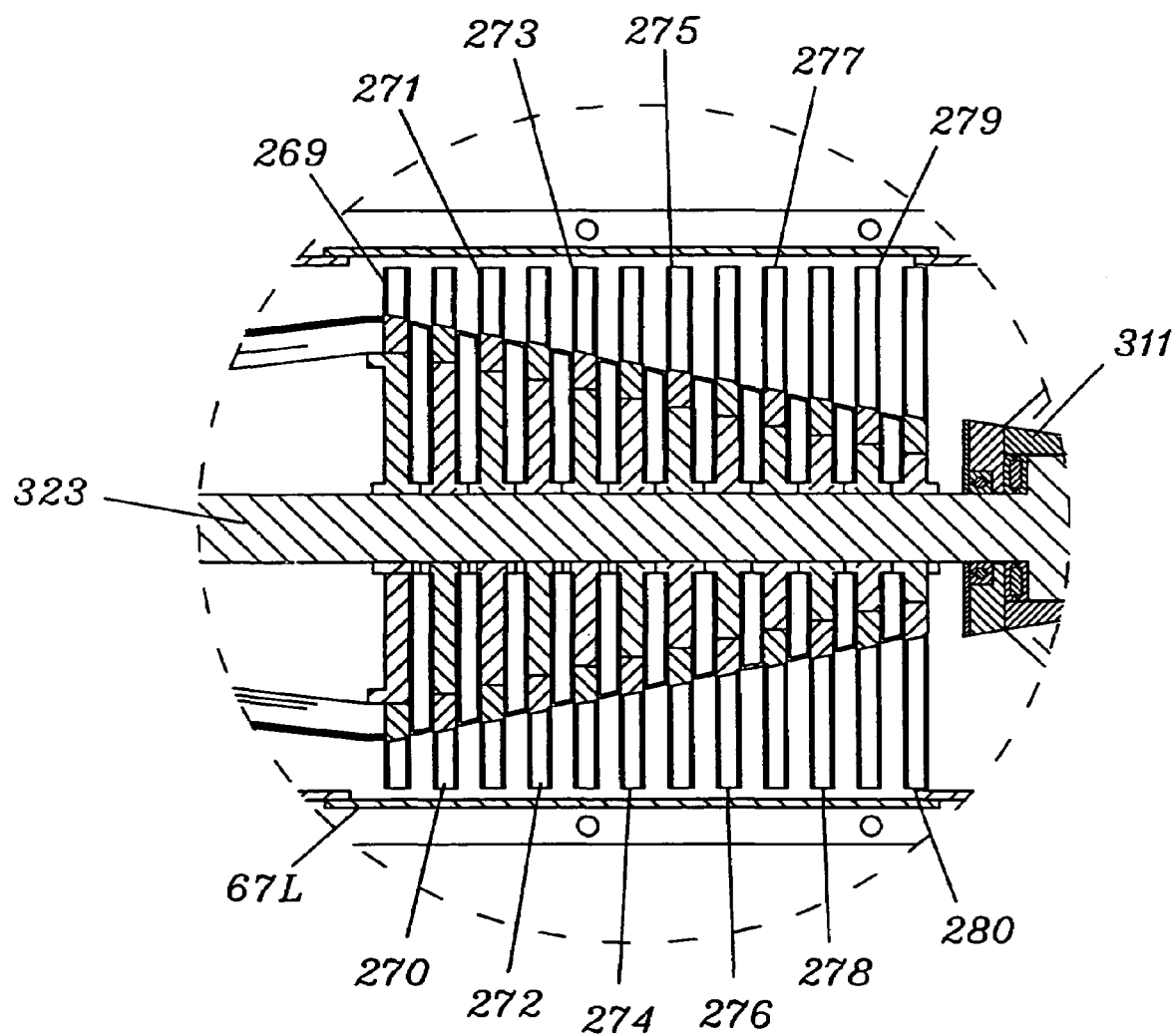
FIG. 5C is an enlarged detailed section view of the turbine rotor blade elements of FIG. 5 with the nozzle elements being hidden from view.
Figure 5D:
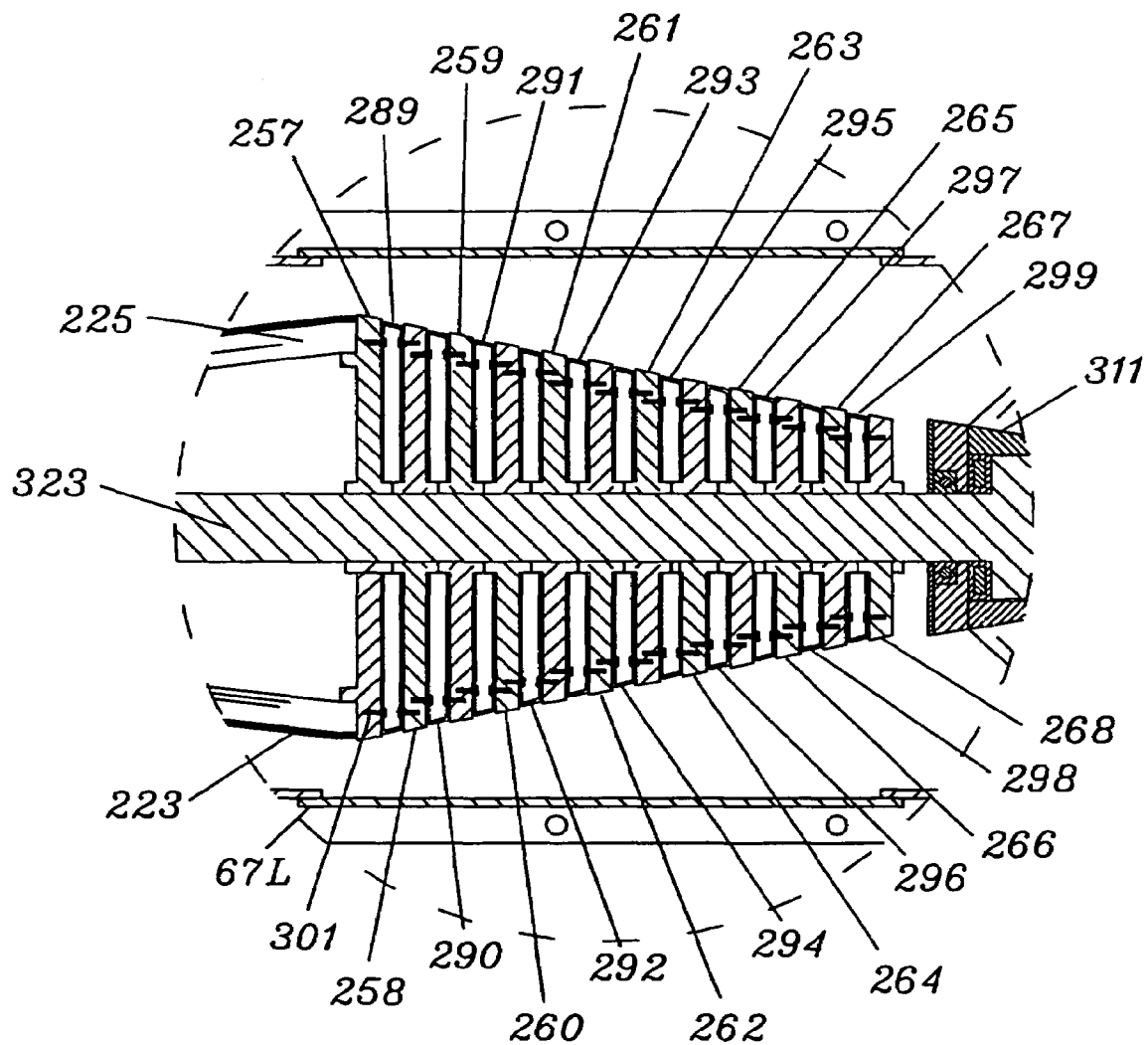
FIG. 5D is an enlarged detailed section view of the power section of the turbine of FIG. 5 with both the nozzle elements and turbine rotor blade elements hidden from view.
Figure 5E:
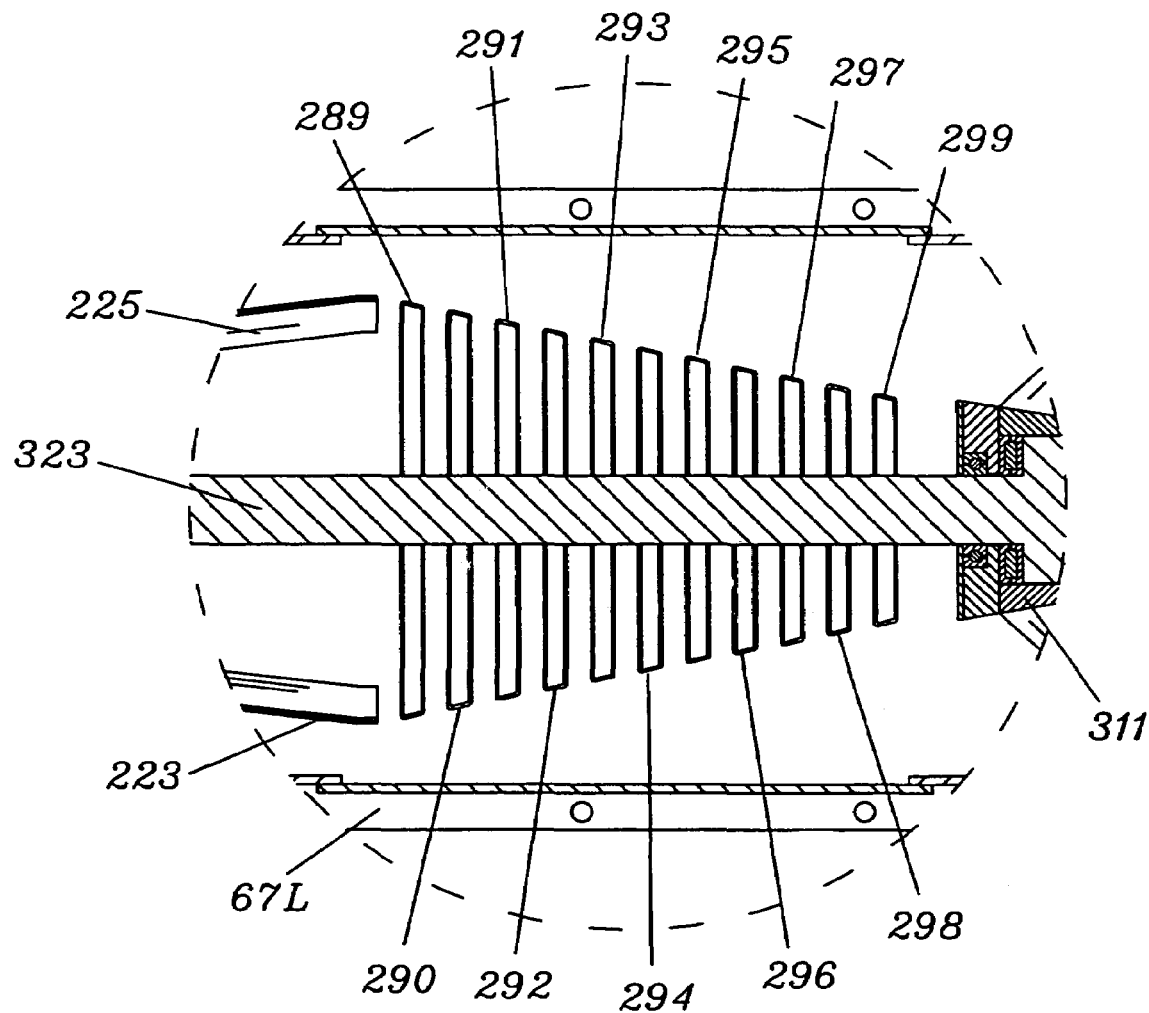
FIG. 5E is an enlarged detailed section view of the power section of the turbine of FIG. 5 with the rotor blade elements, nozzle elements and rotor disc elements hidden from view.

Referring now to FIGS. 5A(2), a horizontal section taken through the nozzle and rotor blade elements near the bottom portion of conduit half 67L is shown. A plurality of intermittent stage nozzle elements 245, 249, 252 and 256 and a plurality of intermittent stage rotor blade elements 269, 273, 276 and 280 are shown. The dashed arrows in FIG. 5A(2) show the relative rotational motion of the rotor blades 269, 273, 276 and 280 in relation to the fixed nozzle elements 245, 249, 252 and 256 that are attached to conduit circuit 67L. The rotational motion of the rotor blades is produced by the primary bypass gas flow through the turbine power section. In FIG. 5B, the turbine rotor blades are hidden from view to better show the stationary nozzle stage elements 245, 246, 247, 248, 249, 250, 251, 252, 253, 254, 255, and 256, i.e. FIG. 5B illustrates nozzle elements that are hidden from view in FIG. 5A(2). Each of the nozzle stage elements are connected to conduit circuit 67L by the circular flange rings. In FIG. 5C, the nozzle stage elements are hidden from view to better show the rotor blade stage elements 269, 270, 271, 272, 273, 274, 275, 276, 277, 278, 279, and 280, i.e. it illustrates rotor blade stage elements that are hidden from view in FIG. 5A(2). As illustrated, each rotor blade element is attached to the outer perimeter of its mating circular rotor disc. In FIG. 5D, both the rotor blade elements and the nozzle stage elements are hidden from view to better show the rotor disc elements 257, 258, 259, 260, 261, 262, 263, 264, 265, 266, 267, and 268 that are attached to the turbine shaft 323. Shroud elements 289, 290, 291, 292, 293, 294, 295, 296, 297, 298, and 299 are also shown, the shroud elements forming the inner gas flow surface boundary of the turbine power section. Each circular shroud element is preferably secured to its adjacent circular rotor disc elements using the fasteners 301. In FIG. 5E, the rotor blade elements, the nozzle stage elements, and rotor disc elements (i.e., rotor blades, nozzle elements and rotor discs) are hidden from view to better show sections of the circular shroud elements 289, 290, 291, 292, 293, 294, 295, 296, 297, 298 and 299 as they are positioned between the rotor discs that are not shown.

Referring now to FIG. 6, rear bearing housing 201 is illustrated in a cross-sectional view at the beginning of the venturi section v, looking downstream. Fasteners 211 attach the four salient strut member segments of bearing housing 201 to the vertically split conduit sections 67L and 67R in the present embodiment. This fixes the item bearing housing 201 to the split conduit members 67L and 67R and restrains it from movement. Upstream radial bearing 205 is housed within the fixed center hub portion 201 and supports the end of turbine shaft 323 which revolves inside bearing 205 (arrow "C"). The arrows "D" show the directional movement of the shell 223 which revolves along with turbine shaft 323 when the turbine is in operation. Fasteners 403 which may be, for example bolts, connect the vertically split conduit segments 67L and 67R together, as described above. Fasteners 403 are preferably equally spaced along both top and bottom mating longitudinal flange segments of 67L and 67R. Fasteners 401, which may also be bolts, connect the flanged ends of vertically split conduit segments 67L and 67R to their mating upstream and downstream flanged conduit segments. Generator driveshaft 72 passes through stuffing boxes 357L and 357R, as also described above. The exterior housings of both stuffing boxes are secured, preferably by welding, around driveshaft 72 penetration openings (not labeled) in conduit halves 67L and 67R.

The upstream portion of the secondary bypass duct 59 of the turbine power section is also illustrated in FIG. 6 along with secondary bypass duct bleed valve 61. As described above, the secondary bypass duct is utilized to control turbine ramp up speed during start initiation. This is accomplished by controlling the quantity of gas flow being diverted around the turbine through the secondary bypass duct. The secondary bypass duct 59 is secured to the vertically split conduit segment 67R, for example by welding. As also described above, the valve 61 is utilized to control the gas flow rate into the secondary bypass duct 59.

Figure 7:
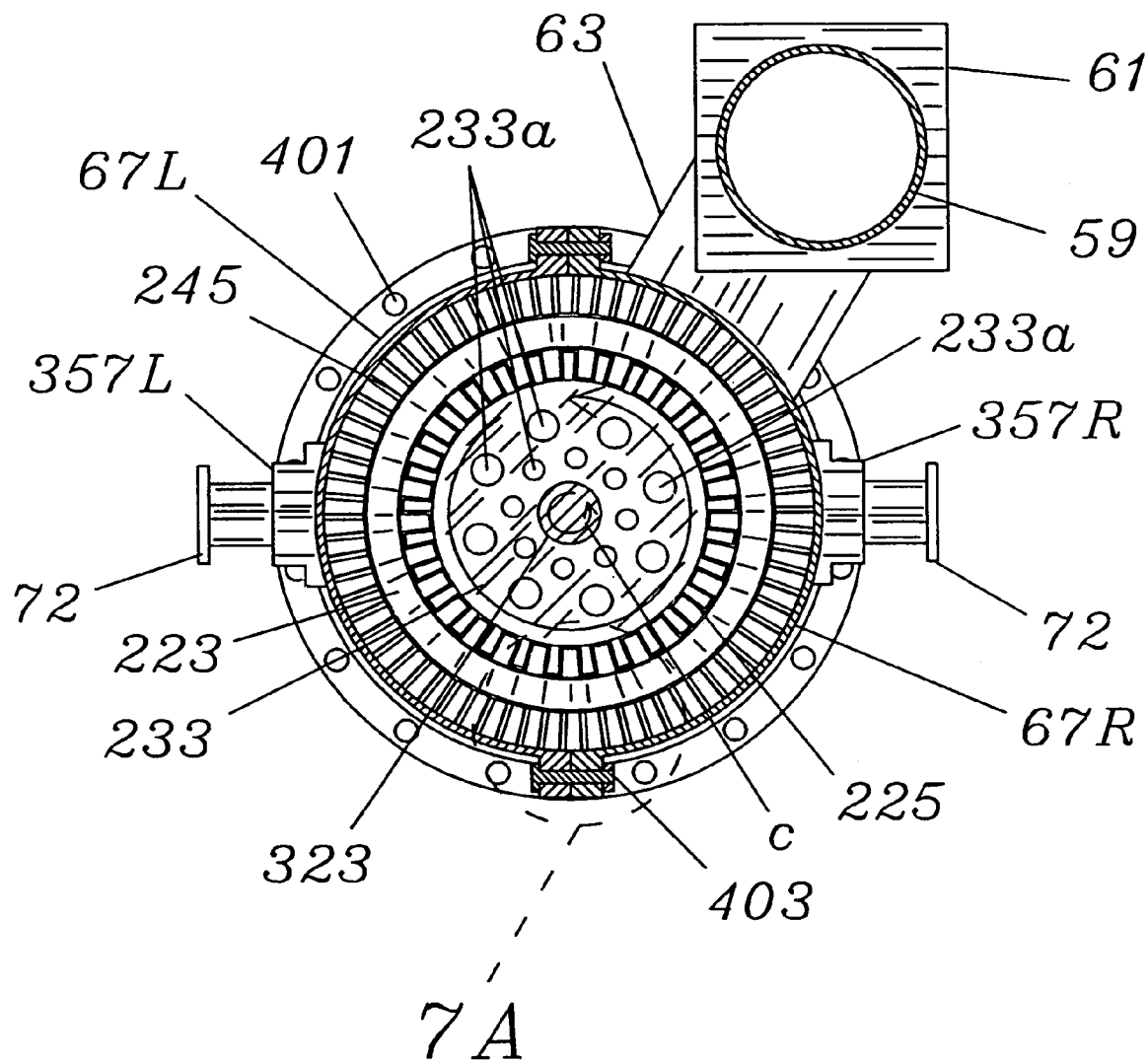
FIG. 7 is a cross-sectional view of the turbine taken between the rear bearing housing and first stage nozzle elements of the turbine along lines 7—7 of FIG. 4.
Figure 7A:
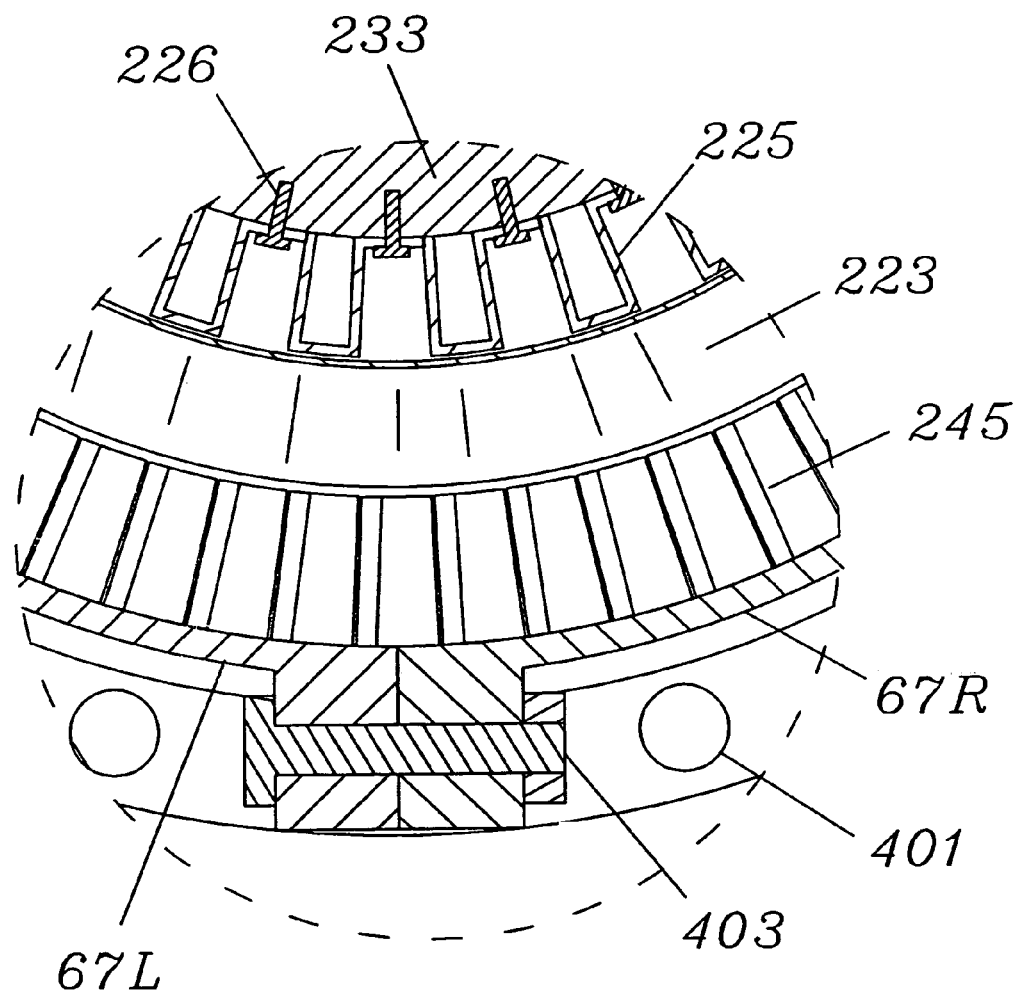
FIG. 7A is an enlarged detailed view of FIG. 7 showing certain structural elements.

Referring now to FIGS. 7 and 7A, a cross-sectional view of the turbine taken between the rear bearing housing 201 and the first stage nozzle element 245 is shown, looking downstream. Rotation of the turbine shaft 323, which rotates along with shell 223, is again shown by the arrow "C".

Radial disc 233 is attached to turbine shaft 323, as described above. Through holes 233a are disposed through the disc in the present embodiment in order to decrease the weight of the disc, and thus decrease the rotational inertia. These holes are not utilized for gas flow through the turbine. Gas flow is restricted to the annular space between the tapered outer shell 223 and the interior wall surface of vertically split conduits 67L and 67R. Corrugated rib structure 225 which supports and reinforces the tapered outer shell 223 is also shown in the Figures. Rib structure 225 is attached to both the circular radial disc 233 and the tapered outer shell 223, for example by fasteners 226. Thus, it can be seen that turbine shaft 323, disc 233, rib structure 225, and outer shell 223 are all interconnected and revolve as a single unit as shown by the directional arrows "C" (shaft) and "E" (disc 233), when the turbine is in operation.

Figure 8:
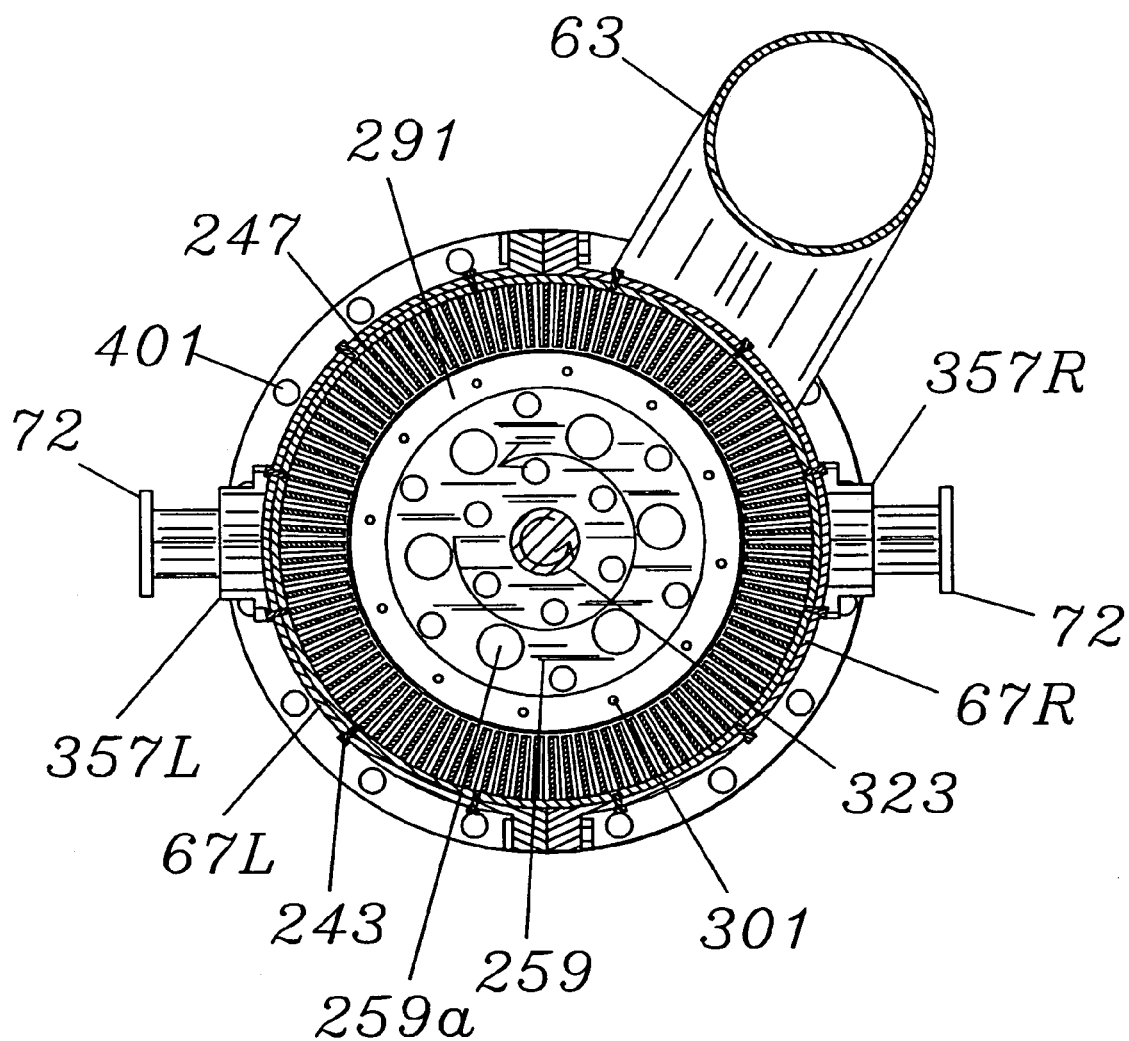
FIG. 8 is a cross-sectional view of the turbine taken through the third stage nozzle element of the turbine power section along lines 8—8 of FIG. 4.

Third stage nozzle element 247 is illustrated in a cross-sectional view in FIG. 8, of the turbine power section, looking downstream. Fasteners 243 may be used to attach the outer flange ring portion of the nozzle stage element 247 to the vertically split conduit halves 67L and 67R. Fasteners 243 are typical for attaching all of the separate nozzle stage elements 245, 246, 247, 248, 249, 250, 251, 252, 253, 254, 255, and 256 to the vertically split conduit halves 67L and 67R. Third stage shroud element 291 is also illustrated. Shroud element 291 is attached to its mating downstream rotor disc element 259 with the fasteners 301, in the present embodiment. Rotor disc 259 may also be attached to turbine shaft 323. Through holes 259a are disposed through the rotor disc 259 in the present embodiment in order to decrease the weight of the disc, and thus decrease the rotational inertia. These holes are not utilized for gas flow through the turbine. Gas flow is restricted to the annular space between the exterior perimeter of third stage shroud element 291 and the interior wall surface of vertically split conduits 67L and 67R. A clearance exists between the inner tip edge of the nozzle elements 247 and the exterior surface of the shroud element item 291. Downstream segment 63 of the secondary bypass duct is also illustrated in FIG. 8, and is attached to the vertically split conduit circuit 67R, for example by welding.

Figure 9:
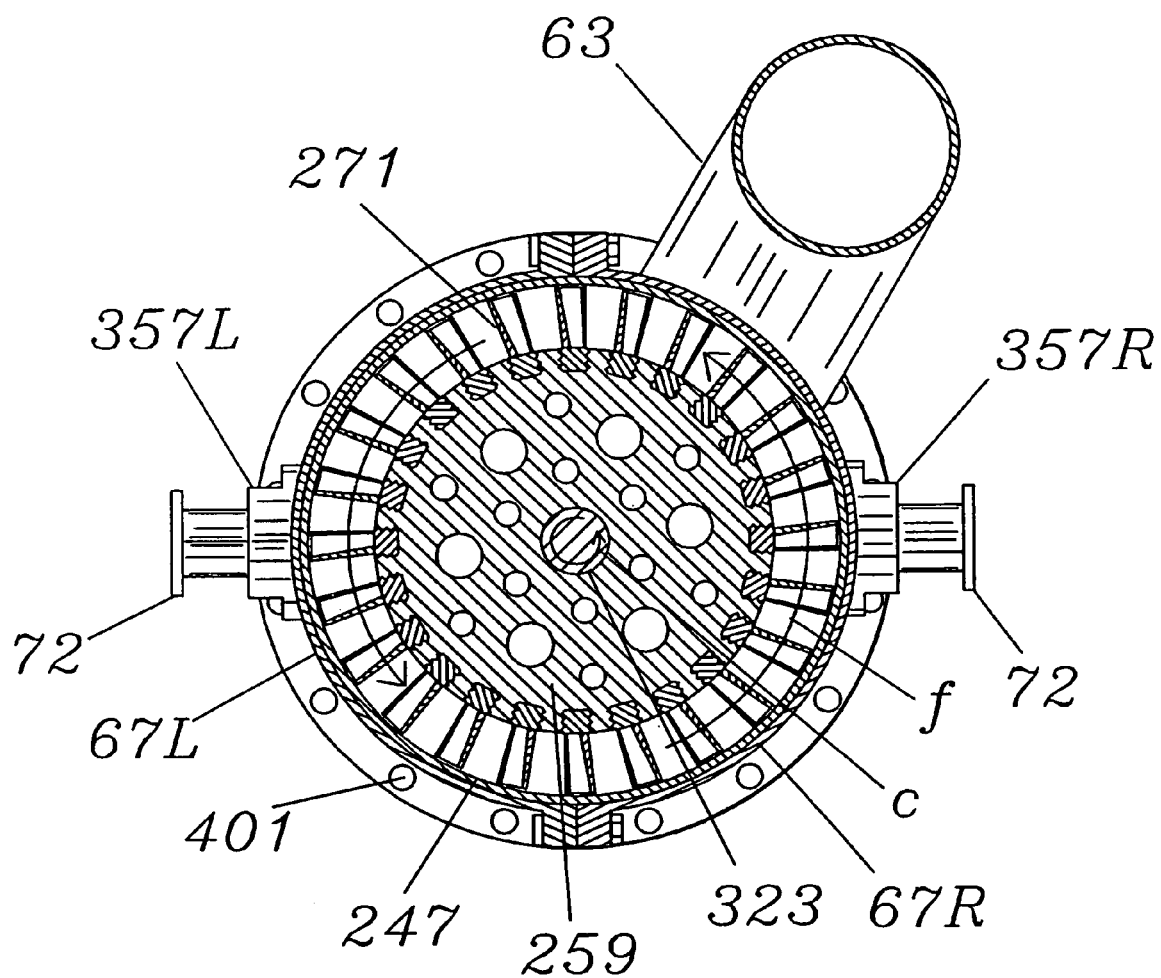
FIG. 9 is a cross-sectional view of the turbine taken through the third stage rotor blade elements along lines 9—9 of FIG. 4.

Referring now to FIG. 9, a cross-sectional view taken through the third stage rotor blade element 271, looking downstream, is illustrated. The rotor blade element 271 is attached to the third stage rotor disc element 259 which, in turn, is attached to the turbine shaft 323. As described above with reference to FIGS. 7 and 8, through holes 271a are disposed through the rotor disc 259 in the present embodiment in order to decrease the weight of the disc, and thus decrease the rotational inertia, and are not utilized for gas flow through the turbine. Gas flow is restricted to the annular space between the exterior perimeter of the rotor disc 259 and the interior wall surface of the circular flange ring of nozzle element 247. A clearance exists between the outer tip edge of the rotor blade 271 and the interior wall surface of the circular flange ring of nozzle item 247. Rotor blades 271, rotor disc 259, and turbine shaft 323 are all interconnected and rotate as a unit as indicated by the direction arrows "C" (shaft) and "F" (rotor blade), when the turbine is in operation.

Figure 10:
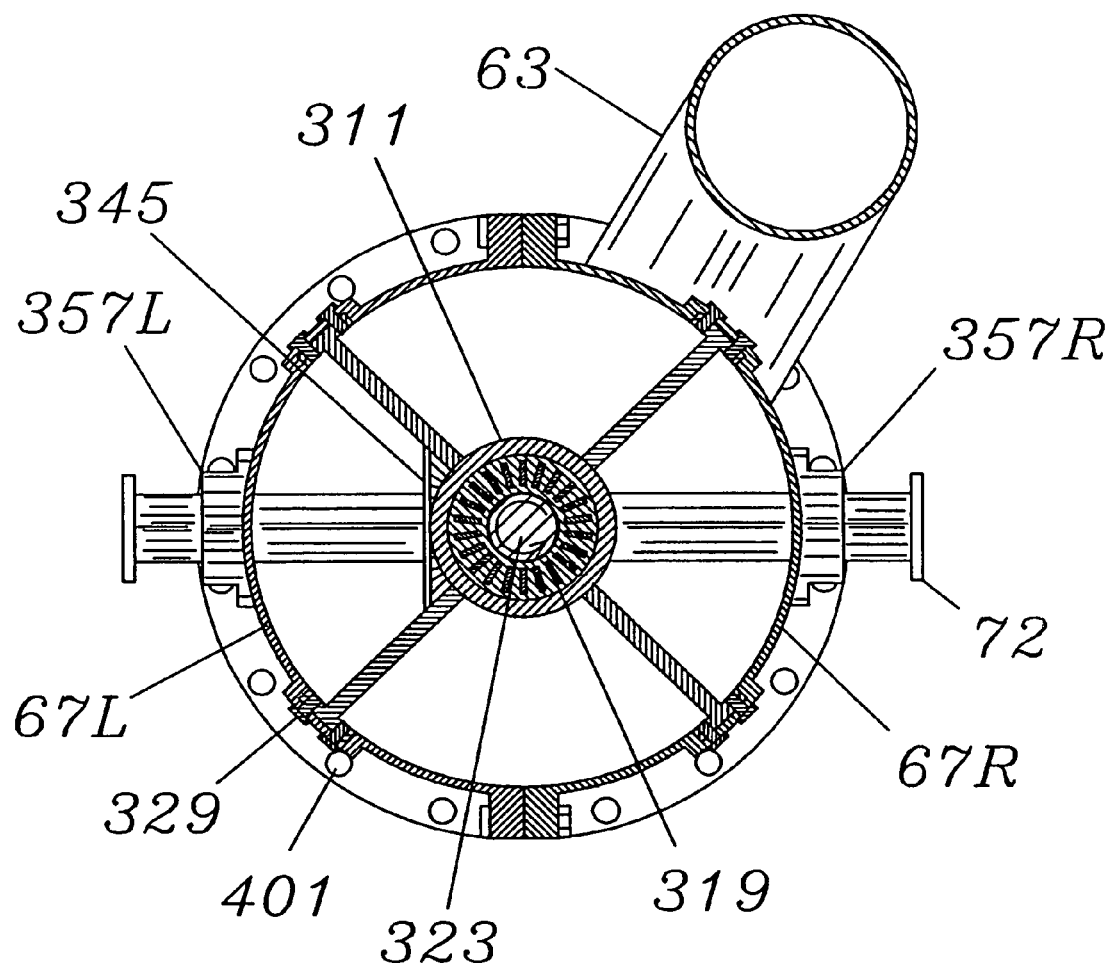
FIG. 10 is a cross-sectional view of the turbine taken through the centerline of the front bearing housing thrust bearing along lines 10—10 of FIG. 4.

Referring now to FIG. 10, a cross-sectional view taken through the centerline of the front bearing housing thrust bearing 319 is illustrated. Thrust bearing 319 is housed within a center hub portion of front bearing housing 311 in the present embodiment. Turbine shaft 323 passes through and rotates within thrust bearing 319 when the turbine is in operation. Fasteners 329 are also provided to attach the salient strut member segments of bearing housing 311 to the vertically split conduit halves 67L and 67R. This fixes the bearing housing 311 to the split conduit halves 67L and 67R and restrains it from any movement.

Figure 11:
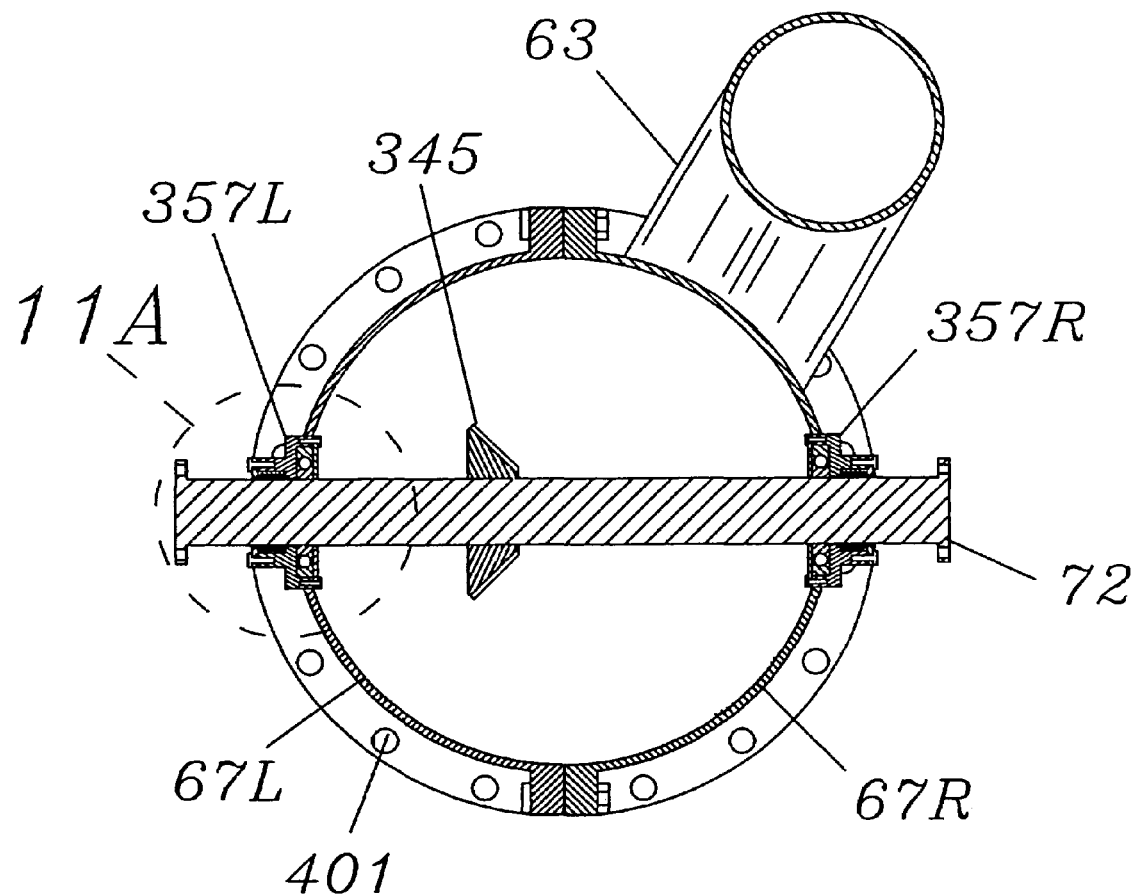
FIG. 11 is a cross-sectional view of the turbine taken through the centerline of the circular generator driveshaft item along lines 11—11 of FIG. 4.
Figure 11A:
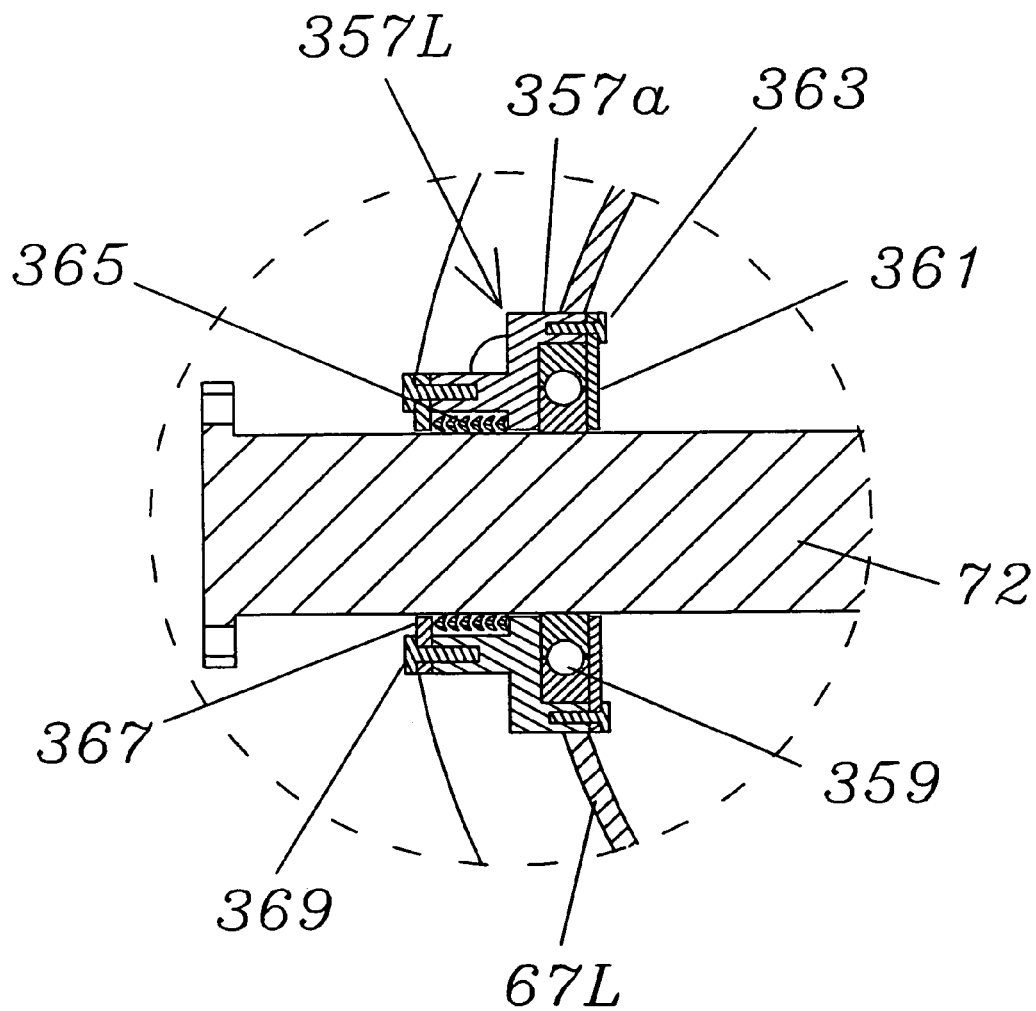
FIG. 11A is an enlarged detailed section view of FIG. 11 showing the left stuffing box.

Conduit halves 67L and 67R are illustrated in cross-section, taken through the centerline of the circular generator driveshaft 72, looking downstream, in FIG. 11. As shown, generator driveshaft 72 passes through the conduit halves 67L and 67R and the stuffing boxes 357L and 357R, as described above. FIG. 11A shows an enlarged view of the left stuffing box 357L of FIG. 1, with it being understood that the right stuffing box 357R is a mirror image thereof. The exterior housing portion 357a of the left stuffing box 357L is utilized for retaining the shaft seals 365 and the radial/thrust bearing 359. The housing portion 357a is secured, for example by welding, around the pipe wall penetration opening in conduit circuit 67L which receives the generator driveshaft 72. During operation of the turbine unit, generator driveshaft 72 revolves within and is supported by radial/thrust bearing item 359. Retainer plate 361 for radial/thrust bearing 359 is preferable secured to the stuffing box housing 357a by fasteners 363. Dynamic seals 365 for preventing gas leakage past the driveshaft 72 are also provided and are retained by a retainer plate 367 which is attached to the stuffing box housing 357a by the fasteners 369, in the present embodiment.

Thus, it will be appreciated that the pressure control system described herein may be utilized to both regulate downstream natural gas distribution pipeline system flow rates and pressures by diverting natural gas through the primary bypass conduit circuit and may also be used to produce electrical power output by harnessing the pressure energy available within the existing natural gas pipeline infrastructure and passing it through a multistage, axial flow, impulse turbine housed within the bypass conduit circuit.

It will be understood that various modifications may be made to the embodiment disclosed herein. For example, dimensions may vary and are only approximations of a preferred embodiment, and any suitable fasteners may be utilized to operatively connect the various elements described herein. In addition, the high-pressure natural gas transmission pipeline is exemplary and its construction may be varied, as would be known in the art. Likewise, the number and structure of the valves, pressure regulators etc. which are included in the pipeline may be varied and may be of any suitable construction. Also, the orientation of the drive shaft of the generator with respect to the turbine shaft may also readily be varied, for example, they could be at a different angle than illustrated, or be in line with each other, as would be known to those of skill in the art. Therefore, the above description should not be construed as limiting, but merely as exemplifications of a preferred embodiment. Those skilled in the art will envision other modifications within the scope, spirit and intent of the invention.

What is claimed is:

1. An apparatus for producing electrical power within a natural gas pipeline infrastructure utilizing pressure energy from natural gas flowing through the natural gas pipeline, the pipeline including a distribution pipeline main that branches off the pipeline, the apparatus comprising:

a pressure control system constructed and arranged to balance a flow rate of the natural gas, the control system including:

a) a primary bypass conduit circuit constructed and arranged to divert gas flow from the distribution pipeline main;
   b) at least one pressure regulator valve constructed and arranged to reduce gas pressure within the primary bypass conduit circuit as needed;
   c) at least one modulating valve constructed and arranged to control gas flow within the primary bypass conduit circuit; and
   d) at least one or more flow sensors;

a turbine disposed within the primary bypass conduit circuit and operatively connected to a generator, the turbine receiving gas flow from the natural gas pipeline through the primary bypass conduit circuit and converting the flow of gas to electrical power output;

a microprocessor governor control system constructed and arranged to send and receive signals to initiate and regulate operation of the turbine; and wherein as electrical load on the generator and downstream customer demand for gas fluctuates, the pressure control system regulates the amount of gas flowing through the turbine so as to produce a steady state electrical output.

2. The apparatus of claim 1, wherein the turbine includes a tapered outer shell.

3. The apparatus of claim 2, wherein the tapered outer shell includes a venturi section constructed and arranged to increase velocity of the gas flow rate within the turbine.

4. The apparatus of claim 3, wherein the tapered outer shell further includes a power section downstream from the venturi section.

5. The apparatus of claim 1, further comprising a secondary turbine bypass constructed and arranged to divert gas flow around the turbine.

6. The apparatus of claim 1, further comprising a secondary modulating valve bypass constructed and arranged to control gas pressurization of the primary bypass conduit circuit after the turbine is initially charged with gas.

7. The apparatus of claim 1, wherein the turbine further includes a turbine shaft rotationally supported at a downstream end within a front bearing housing and rotationally supported at an upstream end within a rear bearing housing.

8. The apparatus of claim 1, wherein the turbine is disposed within a conduit including a first half and a second half which are separable from each other.

9. The apparatus of claim 1, further including one or more valves constructed and arranged to isolate gas flow to the primary bypass circuit conduit from the distribution pipeline main, as needed.

10. The apparatus of claim 1, further comprising a combustible gas detector.

11. The apparatus of claim 1, further comprising a gas flow transmitter.

12. The apparatus of claim 1, further comprising a frequency transducer constructed and arranged to signal the governor control system when the electrical output reaches or deviates from a predetermined level.

13. The apparatus of claim 1, wherein the turbine includes a plurality of intermittent stage stationary nozzle elements supported therein.

14. A method of converting gas energy from a pipeline main into electrical power comprising the steps of:

providing a turbogenerator disposed within a primary bypass conduit circuit, the conduit circuit constructed and arranged to divert flow from a distribution pipeline main;

detecting the amount of the gas flow within the distribution pipeline main and signaling a governor control system;

diverting gas flow from the pipeline main to the primary bypass conduit circuit, such that the gas flow is received within the turbine;

actuating an electrohydraulic starter so as to begin rotation of the turbine;

actuating one or more modulating valves to control gas flow within the primary bypass conduit;

increasing turbine speed by increasing the gas flow through the turbine until the electrical output produced by the turbine reaches a predetermined, steady state frequency level.

15. The method of claim 14, wherein the step of diverting gas flow further comprises the steps of:

sending a control signal from the governor control to actuate a loading valve to pressurize the primary bypass conduit;

closing the loading valve upon completion of primary bypass loading.

16. The method of claim 14 further comprising the steps of:

closing a secondary bypass modulating valve to increase the turbine speed;

disengaging the electrohydraulic starter from the turbine;

opening and closing the one or more modulating valves, as needed, to increase or decrease gas flow into the primary bypass conduit circuit as needed;

continuously sending feedback signals to the governor control system in order to adjust the gas flow into the primary bypass conduit so as to maintain the electrical output at the predetermined steady state frequency.

17. The method of claim 16 further comprising the step of:

initiating turbine shutdown when the frequency falls below the predetermined level.

18. The method of claim 17 further comprising the step of stopping rotation of the turbine comprising the steps of:

opening a circuit breaker;

activating a magnetic brake;

opening a primary bypass valve; closing a modulating valve;

opening the secondary bypass valve; and performing the above steps until the turbine comes to a stop.

19. The method of claim 18 further comprising the step of:

keeping the turbine stopped until gas demand is restored to a minimum level required for producing the electrical output at the predetermined steady state frequency.

20. An apparatus for producing electrical power within a natural gas pipeline infrastructure utilizing pressure energy from natural gas flowing through the natural gas pipeline, the pipeline including a distribution pipeline main that branches off the pipeline, the apparatus comprising:

a pressure control system constructed and arranged to balance a flow rate of the natural gas, the control system including:

a) a primary bypass conduit circuit constructed and arranged to divert gas flow from the distribution pipeline main;

b) at least one pressure regulator valve constructed and arranged to reduce gas pressure within the primary bypass conduit circuit as needed;

c) at least one modulating valve constructed and arranged to control gas flow within the primary bypass conduit circuit; and d) at least one or more flow sensors;

a turbine disposed within the primary bypass conduit circuit and operatively connected to a generator, the turbine including a tapered outer shell and receiving gas flow from the natural gas pipeline through the primary bypass conduit circuit and converting the flow of gas to electrical power output;

a micro processor governor control system constructed and arranged to send and receive signals to initiate and regulate operation of the turbine;

a secondary turbine bypass constructed and arranged to divert gas flow around the turbine;

a secondary modulating valve bypass constructed and arranged to control gas pressurization of the primary bypass conduit circuit after the turbine is initially charged with gas; and wherein as electrical load on the generator and downstream customer demand for gas fluctuates, the pressure control system regulates the amount of gas flowing through the turbine so as to produce a steady state electrical output.

21. The apparatus of claim 20, wherein the tapered outer shell includes a venturi section constructed and arranged to increase velocity of the gas flow rate within the turbine.

22. The apparatus of claim 21, wherein the tapered outer shell further includes a power section downstream from the venturi section.

23. The apparatus of claim 20, further comprising two or more rib elements constructed and arranged to support the outer shell.

24. The apparatus of claim 20, wherein the turbine is disposed within a conduit including a first half and a second half which are separable from each other.

* * * * *